United States Patent
Yamaguchi et al.

(10) Patent No.: US 9,859,750 B2
(45) Date of Patent: Jan. 2, 2018

(54) POWER DISTRIBUTION CONTROL APPARATUS, ELECTRICITY STORAGE SYSTEM, AND POWER DISTRIBUTION CONTROL METHOD

(71) Applicant: Panasonic Intellectual Property Management Co., Ltd., Osaka (JP)

(72) Inventors: Takao Yamaguchi, Osaka (JP); Yoshikazu Mihara, Hyogo (JP); Hiroshi Hanafusa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 212 days.

(21) Appl. No.: 14/918,523

(22) Filed: Oct. 20, 2015

(65) Prior Publication Data

US 2016/0043596 A1    Feb. 11, 2016

Related U.S. Application Data

(63) Continuation of application No. PCT/JP2014/003294, filed on Jun. 19, 2014.

(30) Foreign Application Priority Data

Jun. 28, 2013  (JP) ................................. 2013-136339

(51) Int. Cl.
  *H02J 9/00*  (2006.01)
  *H02J 9/06*  (2006.01)

(52) U.S. Cl.
  CPC .............. *H02J 9/061* (2013.01); *H02J 9/062* (2013.01)

(58) Field of Classification Search
  CPC .... H02J 9/062; H02J 9/061; H02J 9/06; H02J 9/08; H01H 2300/018

(Continued)

(56) References Cited

U.S. PATENT DOCUMENTS 7,081,827 B2* 7/2006 Addy ........................ G06F 1/30
                                                                 307/38
7,119,457 B1* 10/2006 Flegel ...................... H02J 3/14
                                                                 307/64

(Continued)

FOREIGN PATENT DOCUMENTS

JP    58-051747    3/1983
JP    10-031536    2/1998

(Continued)

OTHER PUBLICATIONS

International Search Report of PCT application No. PCT/JP2014/003294 dated Jul. 22, 2014.

*Primary Examiner* — Quan Tra

(74) *Attorney, Agent, or Firm* — Greenblum & Bernstein, P.L.C.

(57) ABSTRACT

A power distribution control apparatus includes a power source switcher that switches a power source for supplying electric power to a plurality of load groups between a commercial power source and a battery, control circuitry that controls the power source switcher and a plurality of switches provided in power supply paths between the power source switcher and each of the load groups, and a memory that stores positions of the plurality of switches in the order of priority. When the power source switcher switches to the commercial power source and a power saving time zone in which commercial power consumption is to be reduced is reached, the control circuitry controls the switches to be in a non-conducting state, switches the power source from the commercial power source to the battery using the power source switcher, and sequentially controls the switches in a conducting state in the order of priority.

13 Claims, 26 Drawing Sheets

(58) Field of Classification Search
USPC .................................................. 307/29, 64
See application file for complete search history.

(56) References Cited

U.S. PATENT DOCUMENTS

| | | | |
|---|---|---|---|
| 2010/0019574 A1* | 1/2010 | Baldassarre | H02J 3/14 307/23 |
| 2011/0298286 A1* | 12/2011 | Batzler | H02J 3/14 307/41 |
| 2012/0158198 A1 | 6/2012 | Black et al. | |
| 2012/0242293 A1 | 9/2012 | Yumura et al. | |
| 2013/0254370 A1* | 9/2013 | Hu | H04L 12/14 709/223 |
| 2015/0073614 A1 | 3/2015 | Yoshida et al. | |

FOREIGN PATENT DOCUMENTS

| | | |
|---|---|---|
| JP | 2000-013933 | 1/2000 |
| JP | 2007-174836 | 7/2007 |
| JP | 2010-081751 | 4/2010 |
| JP | 2012-135193 | 7/2012 |
| JP | 2012-205430 | 10/2012 |
| JP | 2013-066270 | 4/2013 |
| JP | 2015-056958 | 3/2015 |

* cited by examiner

| SMART METER ID | CONSUMER ID | SWITCH ID | INSTANTANEOUS MAXIMUM CURRENT VALUE IN PREVIOUS SWITCH OPERATION (A) |
|---|---|---|---|
| 1 | 1 | 1 | 280 A |
| 2 | 2 | 2 | 460 A |
| 3 | 3 | 3 | 430 A |

METER INFORMATION STORAGE UNIT

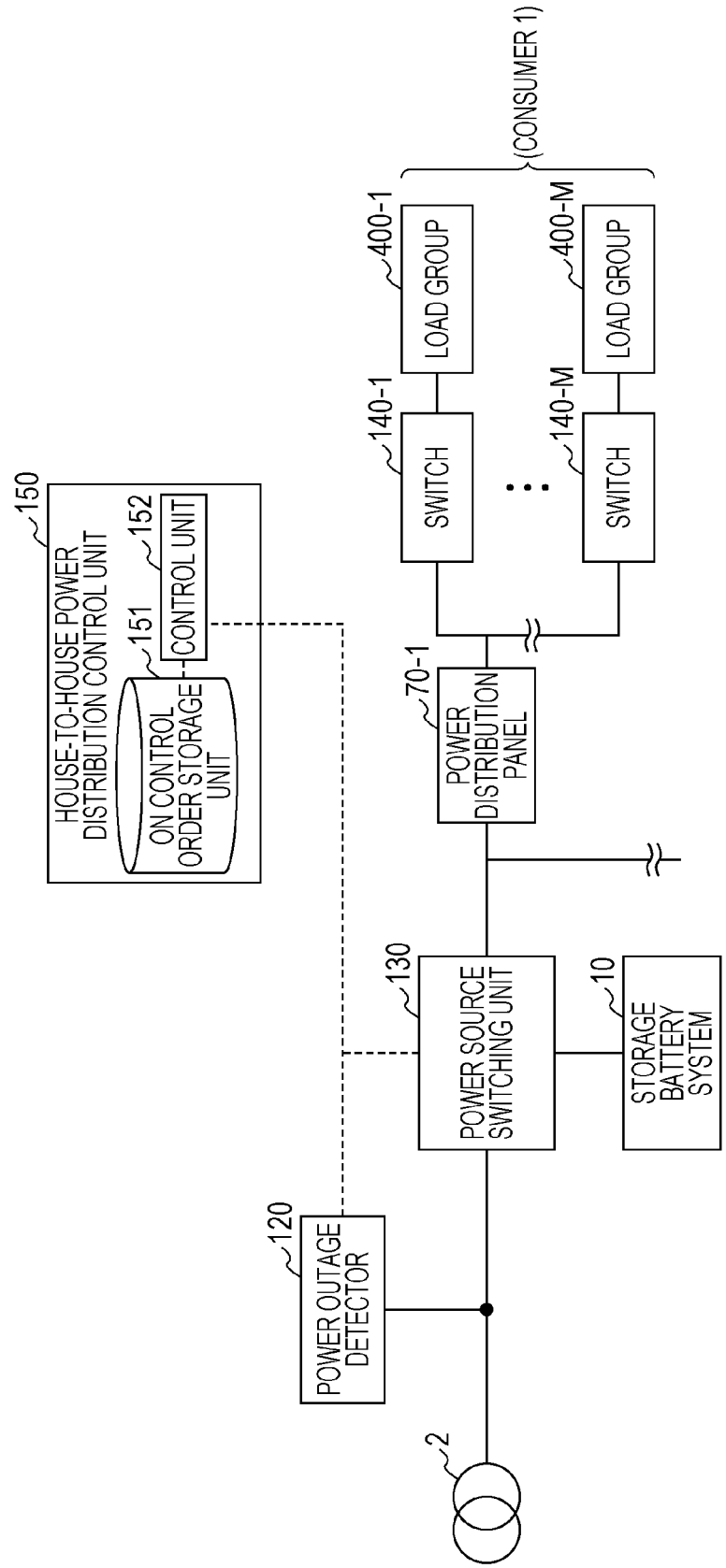

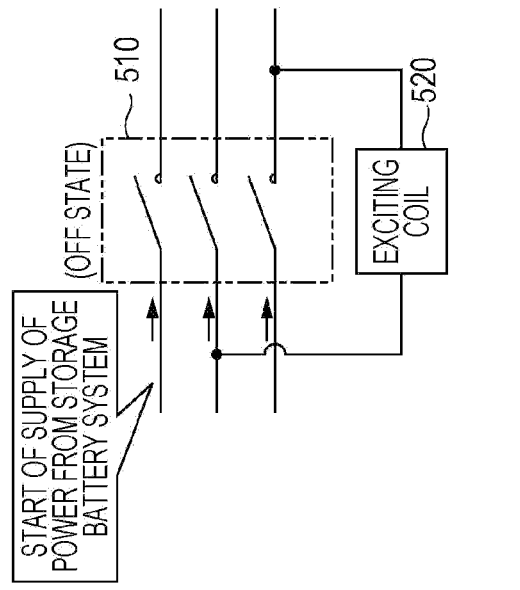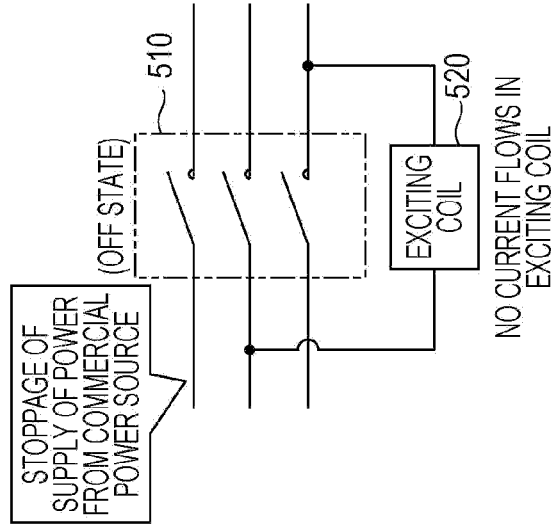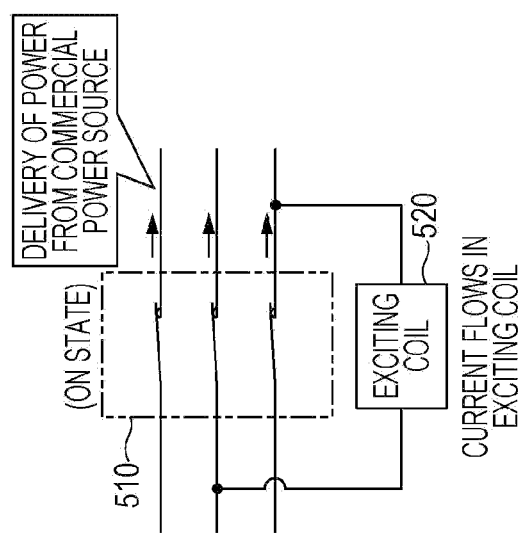

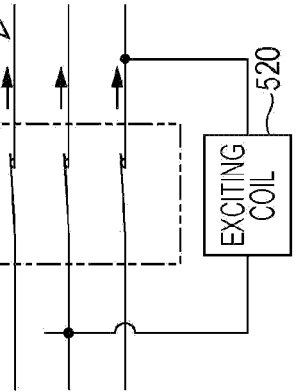

FIG.16A

| TARGET APPLIANCE \ LOAD TYPE | SPECIFIC LOAD GROUP | GENERAL LOAD GROUP |
|---|---|---|
| LIGHTING EQUIPMENT | LIGHTING EQUIPMENT FOR ROOM A | LIGHTING EQUIPMENT FOR ROOMS OTHER THAN ROOM A |
| REFRIGERATOR-FREEZER | AIR BLOWER | COMPRESSOR |
| AIR CONDITIONER | INDOOR UNIT | OUTDOOR UNIT |

FIG.16B

| ON CONTROL ORDER | 1 | 2 | 3 |
|---|---|---|---|
| RULE FOR POWER SUPPLY FROM STORAGE BATTERY SYSTEM | SUPPLY POWER TO SPECIFIC LOAD GROUP | SUPPLY POWER TO GENERAL LOAD GROUP OF AIR CONDITIONER | SUPPLY POWER TO THE OTHER GENERAL LOAD GROUPS |

POWER DISTRIBUTION CONTROL APPARATUS, ELECTRICITY STORAGE SYSTEM, AND POWER DISTRIBUTION CONTROL METHOD

BACKGROUND

1. Technical Field

The present disclosure relates to a power distribution control apparatus, an electricity storage system, and a power distribution control method.

2. Description of the Related Art

When electric power is supplied to a load, such as an electrical appliance, a large amount of electric current called "inrush current" temporarily flows until the load reaches a steady state. If an inrush current flows through a plurality of loads at the same time, the voltage of an electricity distribution line abruptly decreases and, thus, an undervoltage situation occurs in the loads.

To address such an issue, as existing technology, electric power is supplied to a plurality of apparatuses (loads) at random. The value of an inrush current is measured. If the measurement value exceeds a predetermined value, an apparatus that supplies electric power is changed (refer to, for example, Japanese Unexamined Patent Application Publication No. 10-031536).

SUMMARY

In recent years, some condominium buildings and some manufacturing buildings have used a storage battery system installed therein as a backup power source when commercial power is insufficient or lost. Thus, there has been a growing demand for a technology for stably operating the plurality of apparatuses while preventing a decrease in the voltage.

One non-limiting and exemplary embodiment provides a power distribution control apparatus that stably supplies electric power when supply of the electric power from a storage battery system to a load group is started.

In one general aspect, the techniques disclosed here feature a power distribution control apparatus including a power source switcher operative to switch a power source for supplying electric power to a plurality of load groups between a commercial power source and a battery, control circuitry operative to control the power source switcher and a plurality of switches provided in power supply paths between the power source switcher and each of the load groups, and a memory operative to store positions of the plurality of switches in the order of priority. When the power source switcher switches to the commercial power source and a power saving time zone in which commercial power consumption is to be reduced is reached, the control circuitry controls the plurality of switches to be in a non-conducting state, switches the power source from the commercial power source to the battery using the power source switcher, and sequentially controls the plurality of switches in a conducting state in the order of priority.

According to the aspect of the disclosure, a power distribution control apparatus can stably supply electric power from a storage battery system to a load group when supply of the electric power is started.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 10 illustrates a power distribution control system according to a fourth embodiment;

FIGS. 13A to 13C illustrate the operation performed by the switch according to the fifth embodiment;

FIGS. 14A and 14B illustrate the operation performed by the switch according to the fifth embodiment; and FIG. 14C illustrates the configuration of the switch according to the fifth embodiment;

FIG. 16A illustrates a particular example of a specific load group and a general load group;

FIG. 16B illustrates an example of a rule for determining an ON control order of the switches in the power distribution control system according to the sixth embodiment;

DETAILED DESCRIPTION (Background Knowledge of Disclosure)

Figure 1:
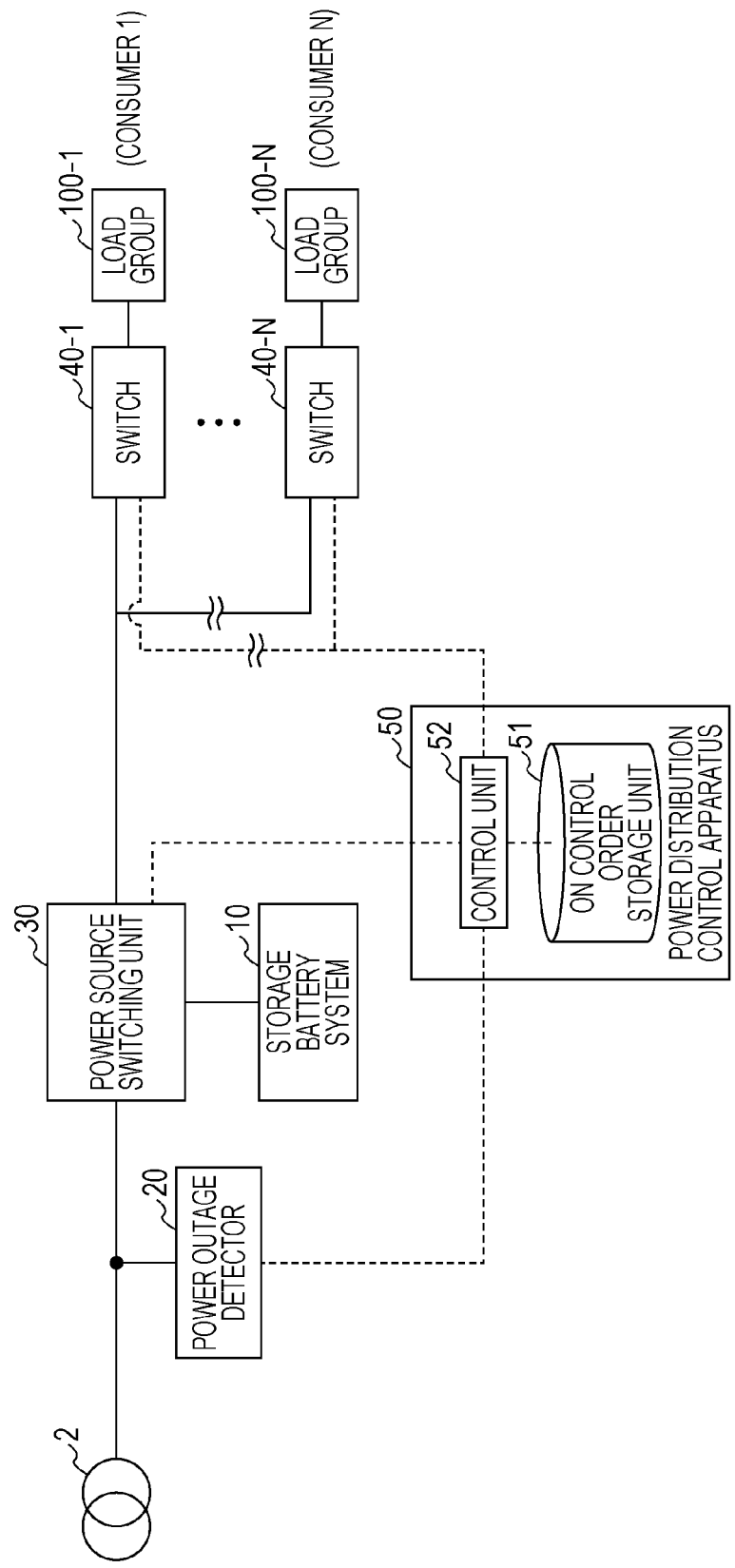
FIG. 1 illustrates a power distribution control system according to a first embodiment.

In recent years, some condominium buildings and some manufacturing buildings have used a storage battery system installed therein as a backup power source when commercial power is insufficient or lost. In such a case, since the conversion capability of a power conditioner provided in the storage battery system is limited, electric energy per unit time that the storage battery system can supply is lower than that of commercial power. Accordingly, when the storage battery system is used as a backup power source and if a voltage drop of an electricity distribution line occurs due to an inrush current, the storage battery system having low electric energy may not compensate for insufficient power and, thus, a critical condition may occur.

For example, according to the technology described in Japanese Unexamined Patent Application Publication No. 10-031536, the power distribution system is not designed to use the storage battery system as a backup power source. Accordingly, a technology for preventing a voltage drop caused by an inrush current and stably operating a storage battery system in the power distribution system that uses the storage battery system as a backup power source is required.

As such a technology, the present inventors discovered that by prioritizing the order in which the apparatuses receive electric power when the electric power is recovered, a voltage drop caused by an inrush current can be prevented and, thus, the apparatuses can be stably operated. For example, by prioritizing the order in which switches deliver electric power and controlling the switches, an inrush current can be prevented.

More specifically, according to an aspect of the present disclosure, a power distribution control apparatus includes a power source switcher operative to switch a power source for supplying electric power to a plurality of load groups between a commercial power source and a battery, control circuitry operative to control the power source switcher and a plurality of switches provided in power supply paths between the power source switcher and each of the load groups, and a memory operative to store positions of the plurality of switches in the order of priority. When the power source switcher switches to the commercial power source and a power saving time zone in which commercial power consumption is to be reduced is reached, the control circuitry controls the plurality of switches to be in a non-conducting state, switches the power source from the commercial power source to the battery using the power source switcher, and sequentially controls the plurality of switches in a conducting state in the order of priority.

Through such a configuration, electric power is stably supplied when supply of the electric power from the storage battery system to the load group is started.

Exemplary embodiments are described in detail below with reference to the accompanying drawings.

Note that each of the embodiments below describes a collective or particular example. A value, a shape, a material, a constituent element, the positions and the connection form of the constituent elements, steps, and the sequence of steps used in the embodiments are only examples and shall not be construed as limiting the scope of the present disclosure. In addition, among the constituent elements in the embodiments described below, the constituent element that does not appear in an independent claim, which has the broadest scope, is described as an optional constituent element.

1. First Embodiment

According to a first embodiment, a power distribution control system supplies electric power from the storage battery system to a load group in case of commercial power outage. At that time, the power distribution control system controls switches each provided in one of power supply paths branched to consumers so that the electric power that is supplied from the storage battery system to the load groups is sequentially delivered to the consumers.

A power distribution control system 1 according to the first embodiment is described with reference to FIG. 1.

For a period of time other than a period during which commercial power is lost, the power distribution control system 1 distributes electric power supplied from a commercial power source to load groups 100-1, . . . , and 100-N via a power distribution network 2. In contrast, for a period of time during which commercial power is lost, the power distribution control system 1 distributes electric power supplied from the storage battery system 10 to load groups 100-1, . . . , and 100-N.

The load groups 100-1, . . . , and 100-N are sets of loads used by consumers 1, . . . , and N, respectively. Note that N represents any number.

The storage battery system 10 receives electric power from a commercial power source and is charged. For a period of time during which commercial power is lost, the storage battery system 10 supplies electric power to the load groups.

According to the present invention, the storage battery to be used may be a fuel cell having an electricity generation capability, a solar cell, or an electricity storage system formed from storage batteries including a plurality of power generators including a gas generator or a diesel or gasoline power generator. In addition, the power supplying capability of the electricity storage system may be expressed as the sum of the power supplying capabilities of the storage batteries.

A power outage detector 20 detects loss of the commercial power and recovery of the commercial power.

In addition, upon detecting loss of commercial power, the power outage detector 20 sends a message indicating the loss of commercial power to a power distribution control apparatus 50 (described in more detail below). Upon detecting recovery of the commercial power, the power outage detector 20 sends a message indicating recovery of the commercial power to a power distribution control apparatus 50.

Note that the power outage detector 20 is an apparatus that performs an existing power outage detecting method and an existing power recovery detecting method. For example, as one of existing power outage detection methods, if the voltage of a power supply path is lower than or equal to a predetermined threshold value, it is determined that power outage occurs. In addition, as one of existing power recovery detection methods, if the voltage of a power supply path continues to be within a predetermined voltage range for a predetermined period of time after detection of power outage, it is determined that power is recovered.

A power supply switching unit 30 selects between the commercial power source and the storage battery system 10 as the electric power source for the load groups 100-1, . . . , and 100-N under the control of the power distribution control apparatus 50 (described in more detail below).

Switches 40-1, . . . , and 40-N are disposed in the power supply paths for the load groups 100-1, . . . , and 100-N, respectively. In addition, each of the switches 40-1, . . . , and 40-N opens and closes the power supply path under the control of the power distribution control apparatus 50 (described in more detail below). Note that the switch 40 is also referred to as a "relay", a "switcher", or a "changer". Herein, to control the switches, electric power is supplied from the storage battery or a utility grid to a controller (a control unit) that controls the switches and the switches themselves at all times.

The power distribution control apparatus 50 includes an ON control order storage unit 51 and a control unit 52.

The ON control order storage unit 51 stores the order in which the control unit 52 performs ON control on the switches 40-1, . . . , and 40-N.

Figure 2:
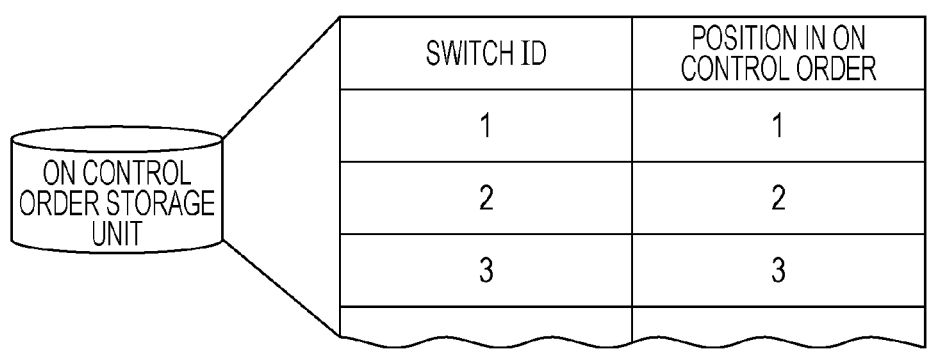
FIG. 2 illustrates an example of information stored in an ON control order storage unit according to the first embodiment.

FIG. 2 illustrates an example of information stored in the ON control order storage unit 51.

As illustrated in FIG. 2, the ON control order storage unit 51 contains a "switch ID" field and an "position in ON control order" field.

The control unit 52 performs power source switch control on the power supply switching unit 30 and performs ON control and OFF control on each of the switches 40-1, . . . , and 40-N. As used herein, the term "ON control" refers to control to close the switch 40 so that the load group is electrically coupled to the power source. In addition, the term "OFF control" refers to control to open the switch 40 so that the load group is electrically coupled to the power source. Herein, to control the power source switching unit, electric power is supplied from the storage battery or the utility grid to a controller (a control unit) that controls the power source switching unit and the power source switching unit itself at all times.

Figure 3:
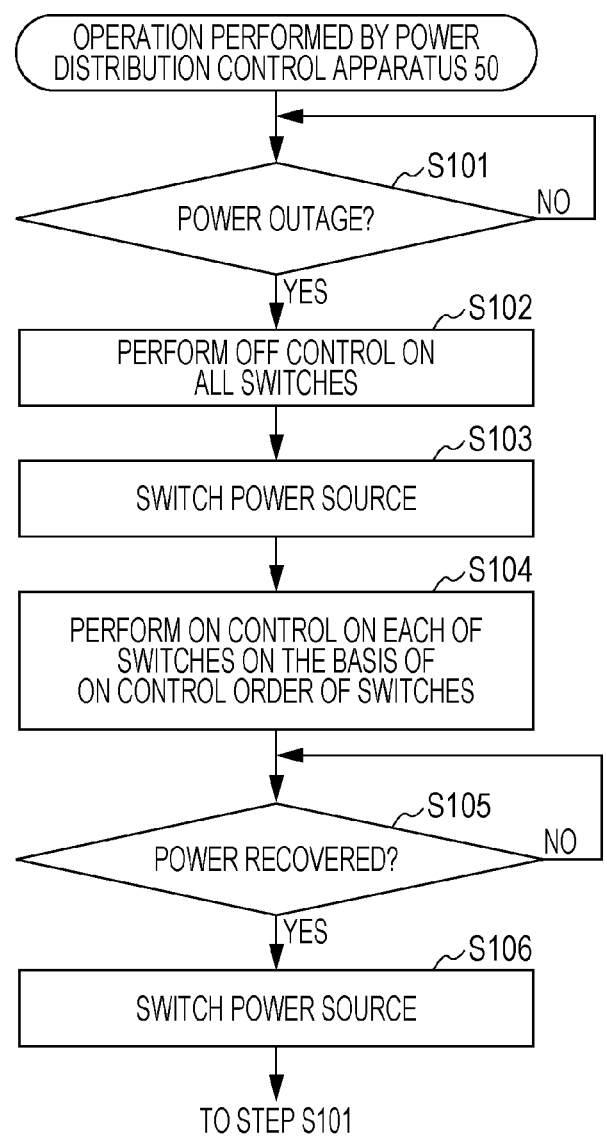
FIG. 3 is a flowchart of the operation performed by a control unit according to the first embodiment.

The operation performed by the control unit 52 is described in detail with reference to a flowchart illustrated in FIG. 3.

Upon receiving, from the power outage detector 20, a message indicating that the commercial power is lost (S101: YES), the control unit 52 performs OFF control on all of the switches 40-1, . . . , and 40-N (S102).

After performing OFF control on all the switches 40-1, . . . , and 40-N (S102), the control unit 52 performs power source switch control so that the power source switching unit 30 switches the power source for the load groups 100-1, . . . , and 100-N from the commercial power source to the storage battery system 10 (S103).

In step S103, the power source switching unit 30 switches the power source for the load groups 100-1, . . . , and 100-N from the commercial power source to the storage battery system 10 and distributes electric power supplied from the storage battery system to the load groups 100-1, . . . , and 100-N.

After performing the power source switch control on the power source switching unit 30 (S103), the control unit 52 sequentially performs ON control on the switches 40-1, . . . , and 40-N on the basis of the ON control order of the switches 40-1, . . . , and 40-N stored in the ON control order storage unit 51 (S104).

For example, if the ON control order storage unit 51 stores the ON control order illustrated in FIG. 2, the control unit 52 selects, from among the switches 40-1, . . . , and 40-N, the switch having a switch ID of "1" and a position in the ON control order of "1" assigned thereto and performs ON control on the selected switch first.

Subsequently, after a predetermined time interval has elapsed since the performance of ON control on the switch having a switch ID of 1, the control unit 52 performs ON control on the switch having a switch ID of "2" and a position in the ON control order of "2" assigned thereto.

Subsequently, in a similar manner, the control unit 52 performs the ON control on the other switches on the basis of the positions in the order assigned to the switches and stored in the ON control order storage unit.

Note that it is desirable that the predetermined time intervals at which the switches 40-1, . . . , and 40-N are subjected to ON control be determined by taking into account a period of time during which the occurrence of inrush current caused by the ON control on each of the switches 40-1, . . . , and 40-N continues.

Referring back to FIG. 3, the following description is given.

After step S104 is performed, if the control unit 52 receives a message indicating recovery of the commercial power from the power outage detector 20 (S105: YES), the control unit 52 performs power source switch control to instruct the power source switching unit 30 to switch the power source for the load groups 100-1, . . . , and 100-N from the storage battery system 10 to the commercial power source (S106).

In step S106, the power source switching unit 30 switches the power source for the load groups 100-1, . . . , and 100-N from the storage battery system 10 to the commercial power source and distributes the electric power to each of the load groups 100-1, . . . , and 100-N.

In addition, if the control unit 52 receives a message indicating recovery of the commercial power from the power outage detector 20 during a period of time from the process in step S101 to the process in step S104, the control unit 52 performs the following processes: (i) if at least one of the switches 40-1, . . . , and 40-N is in an OFF state, the control unit 52 turns ON all of the switches that are in an OFF state; and (ii) if the power source for the load groups 100-1, . . . , and 100-N has been switched from the commercial power source to the storage battery system 10, the control unit 52 performs the power supply switch control to instruct the power source switching unit 30 to switch the power source for the load groups 100-1, . . . , and 100-N from the storage battery system 10 to the commercial power source.

Note that the storage battery system 10, the power outage detector 20, the power source switching unit 30, the switches 40-1, . . . , and 40-N, and the power distribution control apparatus 50 may receive electric power from a power source that is independent from the commercial power source (e.g., a battery) so as to receive electric power even when the commercial power is lost. Alternatively, for a period of time other than a period during which commercial power is lost, the storage battery system 10, the power outage detector 20, the power source switching unit 30, the switches 40-1, . . . , and 40-N, and the power distribution control apparatus 50 may receive electric power from the commercial power source, and may receive electric power from a standby power source that is further provided in the power distribution control system 1, such as an Uninterruptible Power Supply (UPS) for a period of time during which commercial power is lost. A UPS is an apparatus including a battery or a power generator and having a function of supplying electric power to the hardware that requires electric power in the event of a commercial power outage.

According to the power distribution control system of the first embodiment, when supply of electric power from the storage battery system to the load groups is started, the timings at which the switches 40-1, ..., and 40-N are subjected to the ON control do not coincide. Accordingly, a voltage drop of the power supply path caused by an inrush current can be prevented, and electric power can be stably supplied.

2. Second Embodiment

According to the first embodiment described above, the power distribution control system 1 sequentially performs the ON control on the switches disposed in the power supply paths that branch off to the consumers. In contrast, in a power distribution control system according to a second embodiment, the switches are classified into groups on the basis of the power supplying capability of the storage battery system, and the switches in each of the groups are sequentially subjected to the ON control.

A power distribution control system 1A according to the second embodiment is described with reference to FIG. 4. Note that the same numbering will be used in referring to configurations and operations of the second embodiment as is utilized above in the first embodiment, and descriptions of the configurations and operations are not repeated.

The power distribution control apparatus 50A includes an ON control order storage unit 51A and a control unit 52A.

The ON control order storage unit 51A stores the order in which the control unit 52A performs the ON control on the switches 40-1, ..., and 40-N on a group basis. In addition, the groups of the switches 40-1, ..., and 40-N and the positions of the groups of the switches 40-1, ..., and 40-N in the ON control order stored in the ON control order storage unit 51A are set up by a setting apparatus 80 (described in more detail below).

Figure 5:
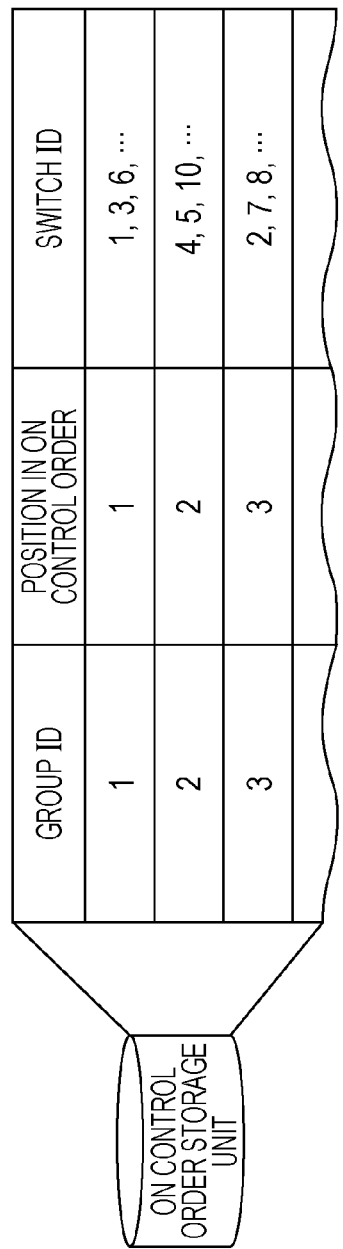
FIG. 5 illustrates an example of information stored in an ON control order storage unit according to the second embodiment.

FIG. 5 illustrates an example of information stored in the ON control order storage unit 51A.

As illustrated in FIG. 5, the ON control order storage unit 51A contains a "group ID" field, an "position in ON control order" field, and a "switch ID" field.

The control unit 52A performs power supply switch control on the power source switching unit 30 and performs ON control and OFF control on each of the switches 40-1, ..., and 40-N.

The control unit 52A sequentially performs ON control on the switches 40-1, ..., and 40-N on a group basis using the positions of the switches 40-1, ..., and 40-N in the ON control order that is stored in the ON control order storage unit 51A.

For example, if the ON control order storage unit 51A stores the ON control order illustrated in FIG. 5, the control unit 52A selects, from among the switches 40-1, ..., and 40-N, the switches having switch IDs of 1, 3, 6, ... which belong to a group having a group ID of "1" and having a position in the ON control order of "1" and performs the ON control on the selected switches. After a predetermined period of time elapses since the performance of the ON control on the switches that belong to the group having a group ID of "1", the control unit 52A performs the ON control on the switches having switch IDs of 4, 5, 10, ... which belong to a group having a group ID of 1 and having a position in the ON control order of "2". Subsequently, in a similar manner, the control unit 52A performs the ON control on the switches which belong to the other groups on the basis of the position in the ON control order assigned to the group and stored in the ON control order storage unit.

The control unit 52A is similar to the control unit 52 of the power distribution control apparatus 50 according to the first embodiment except for the above-described points.

Smart meters 60-1, ..., and 60-N measure a variety of values of the power supply paths of the load groups 100-1, ..., and 100-N, respectively, and cause the setting apparatus 80 to store the obtained measured values. As an example of the measurement, the smart meters 60-1, ..., and 60-N measure the instantaneous maximum current values (the inrush current values) when the commercial power is lost and the switches 40-1, ..., and 40-N are subjected to the ON control.

Note that power measurement means for measuring, for example, consumption power, a current value, and a voltage value is not limited to a smart meter. For example, the power measurement means may be a wattmeter, a CT, or a pulse counter for electric power. The configuration of the loads in each of the groups is examined and adjusted on the basis of consumption power and a current value.

The setting apparatus 80 includes an acquiring unit 81, a meter information storage unit 82, and a setting unit 83. While the present embodiment is described with reference to the setting apparatus 80 separated from the power distribution control apparatus 50A, the setting apparatus 80 and the power distribution control apparatus 50 may be integrated into one body.

The acquiring unit 81 acquires the results of measurement from the smart meters 60-1, ..., and 60-N. Thereafter, the acquiring unit 81 causes the meter information storage unit 82 to store the results of measurement acquired from the smart meters 60-1, ..., and 60-N.

Figure 6:
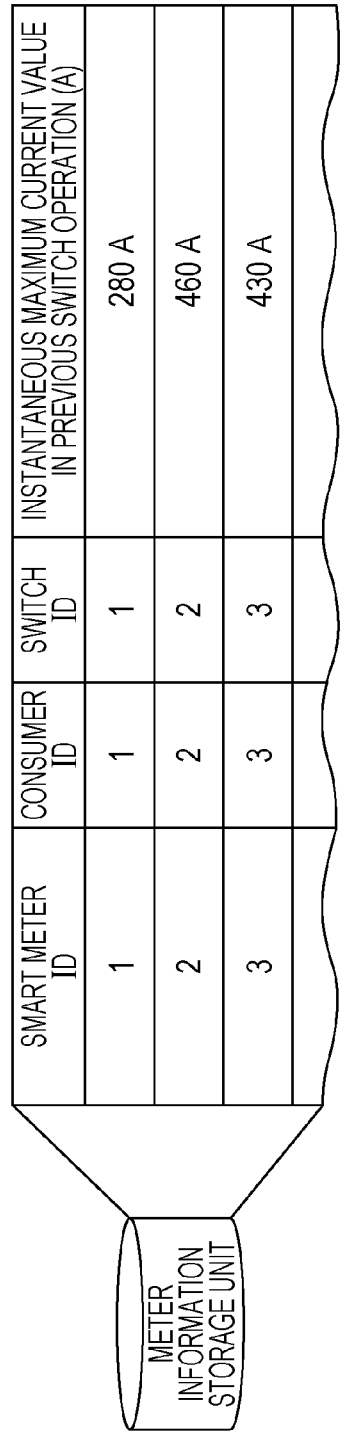
FIG. 6 illustrates an example of information stored in a meter information storage unit according to the second embodiment.

FIG. 6 illustrates an example of information stored in the meter information storage unit 82.

As illustrated in FIG. 6, the meter information storage unit 82 has a "smart meter ID" field, a "consumer ID" field, and a "switch ID" field to store a relationship among a smart meter, a consumer, and a switch. In addition, the meter information storage unit 82 has an "instantaneous maximum current value in previous switch operation (A)" field, which contains the instantaneous maximum current values measured by the smart meters 60-1, ..., and 60-N when the switches 40-1, ..., and 40-N are subjected to the ON control at a time of the immediately previous commercial power outage.

The setting unit 83 classifies the switches 40-1, ..., and 40-N into groups on the basis of the power supplying capability of the storage battery system 10 and the information stored in the meter information storage unit 82.

More specifically, the setting unit 83 refers to the information stored in the meter information storage unit 82 and classifies the switches 40-1, ..., and 40-N into groups on the basis of the power supplying capability of the storage battery system 10 so that a voltage drop of the power supply path does not occur due to an inrush current generated when the switches in each of the groups are subjected to the ON control.

For example, let the meter information storage unit 82 store the results of measurement performed by the smart meters 60-1, ..., and 60-N illustrated in FIG. 6. Then, for example, the setting unit 83 classifies the switches 40-1, ..., and 40-N into groups so that the sum of the instantaneous maximum current values of the switches in each of the groups measured at a time of the immediately previous commercial power outage is less than or equal to a threshold value determined on the basis of the power supplying capability of the storage battery system 10.

Note that the threshold value based on the power supplying capability of the storage battery system 10 for determining that a voltage drop of the power supply path does not occur can be selected through experiments carried out for the power supplying capability of each of the storage battery systems 10 in advance.

In addition, the setting unit 83 freely determines the positions of the switches 40-1, . . . , and 40-N in the ON control order for each of the setup groups.

As described above, in the power distribution control system 1A according to the second embodiment, the switches 40-1, . . . , and 40-N are classified into groups, and the ON control is performed on the switches 40-1, . . . , and 40-N on a group basis when electric power is supplied from the storage battery system 10 to the load groups. As a result, according to the power distribution control system 1A of the second embodiment, a voltage drop of the power supply path caused by an inrush current can be efficiently prevented.

Figure 4:
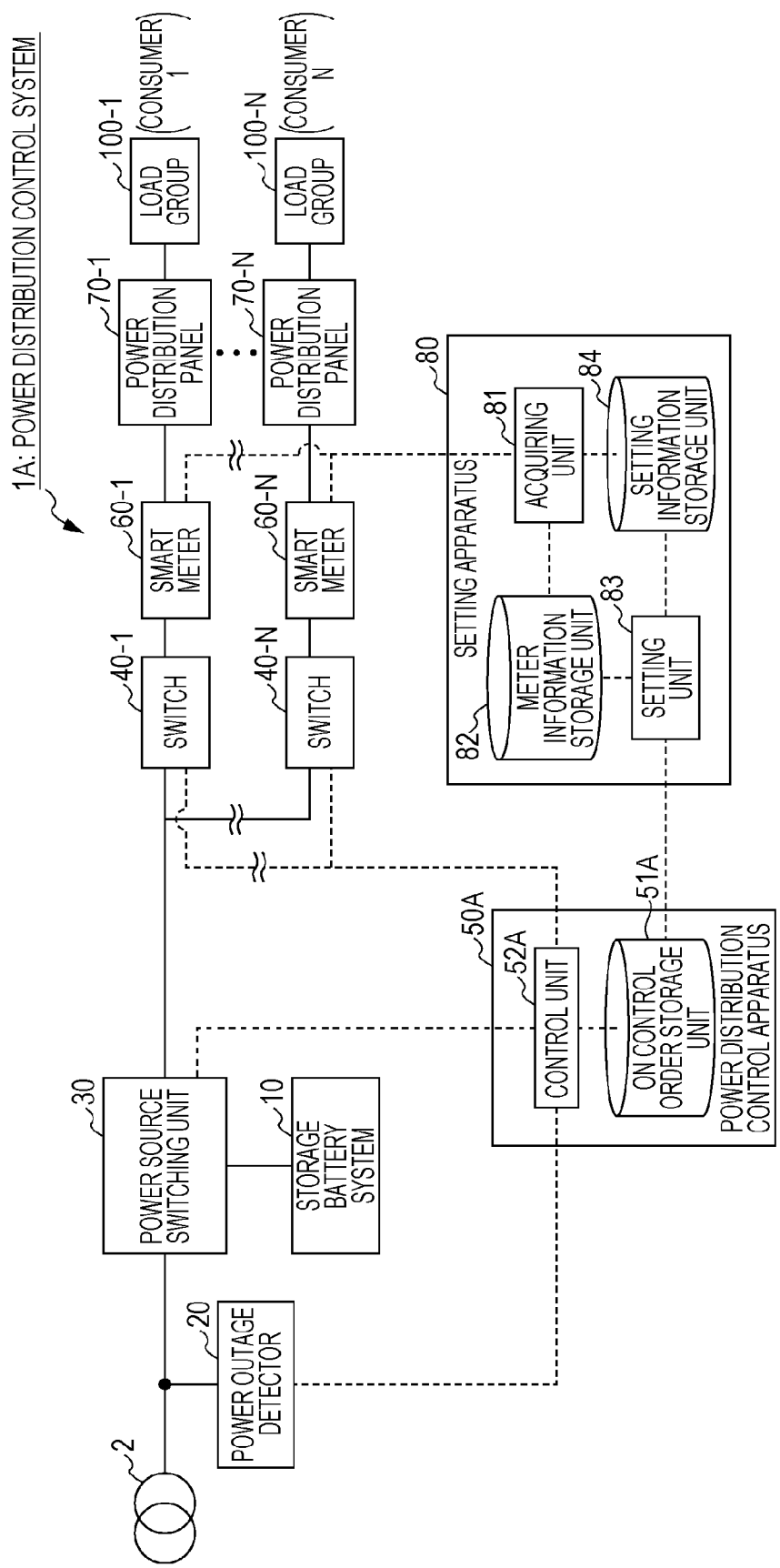
FIG. 4 illustrates a power distribution control system according to a second embodiment.

While, as illustrated in FIG. 4, the switches 40-1, . . . , and 40-N are disposed in the power supply paths upstream of the smart meters 60-1, . . . , and 60-N, respectively, the positions at which the switches 40-1, . . . , and 40-N are installed are not limited thereto.

An example of installation of the switches 40-1, . . . , and 40-N is described with reference to FIG. 7.

Figure 7:
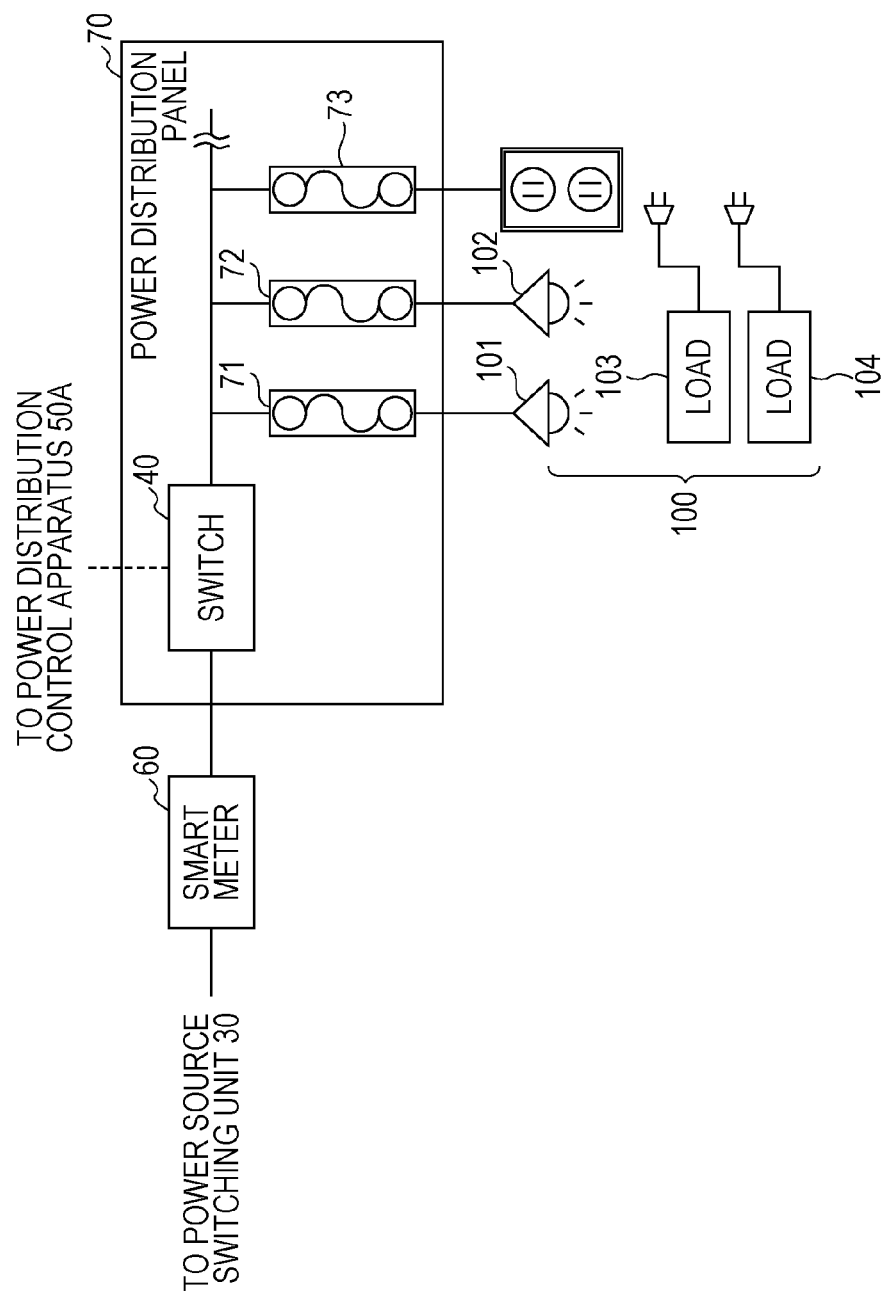
FIG. 7 illustrates an example of installation of switches according to the second embodiment.

As illustrated in FIG. 7, a switch 40 may be incorporated into a power distribution panel 70.

The power distribution panel 70 includes breakers 71, 72, and 73. However, the number of breakers included in the power distribution panel 70 is not limited thereto.

Loads 101, 102, 103, and 104 are disposed downstream of the breakers 71, 72, and 73. Examples of the loads include lighting equipment, such as a room lamp, and a home appliance. Note that a load group 100 illustrated in FIG. 4 represents a set of these loads.

The breakers 71, 72, and 73 interrupt current flow in the power supply paths if abnormal currents flow downstream of the breakers.

Note that the switch 40 may be disposed in the power supply path that branch off to each of the consumers at any one of a variety of positions. For example, the switch 40 may be incorporated into the smart meter 60.

3. Third Embodiment

A power distribution control system according to a third embodiment is described below. The power distribution control system separates a load that requires fast power recovery (hereinafter referred to as a "specific load") from a load that does not require fast power recovery (hereinafter referred to as a "general load") and supplies electric power from an electricity storage system to a load group. Note that the same numbering will be used in referring to configurations and operations of the third embodiment as is utilized in the above-described embodiments, and descriptions of the configurations and operations are not repeated.

Figure 8:
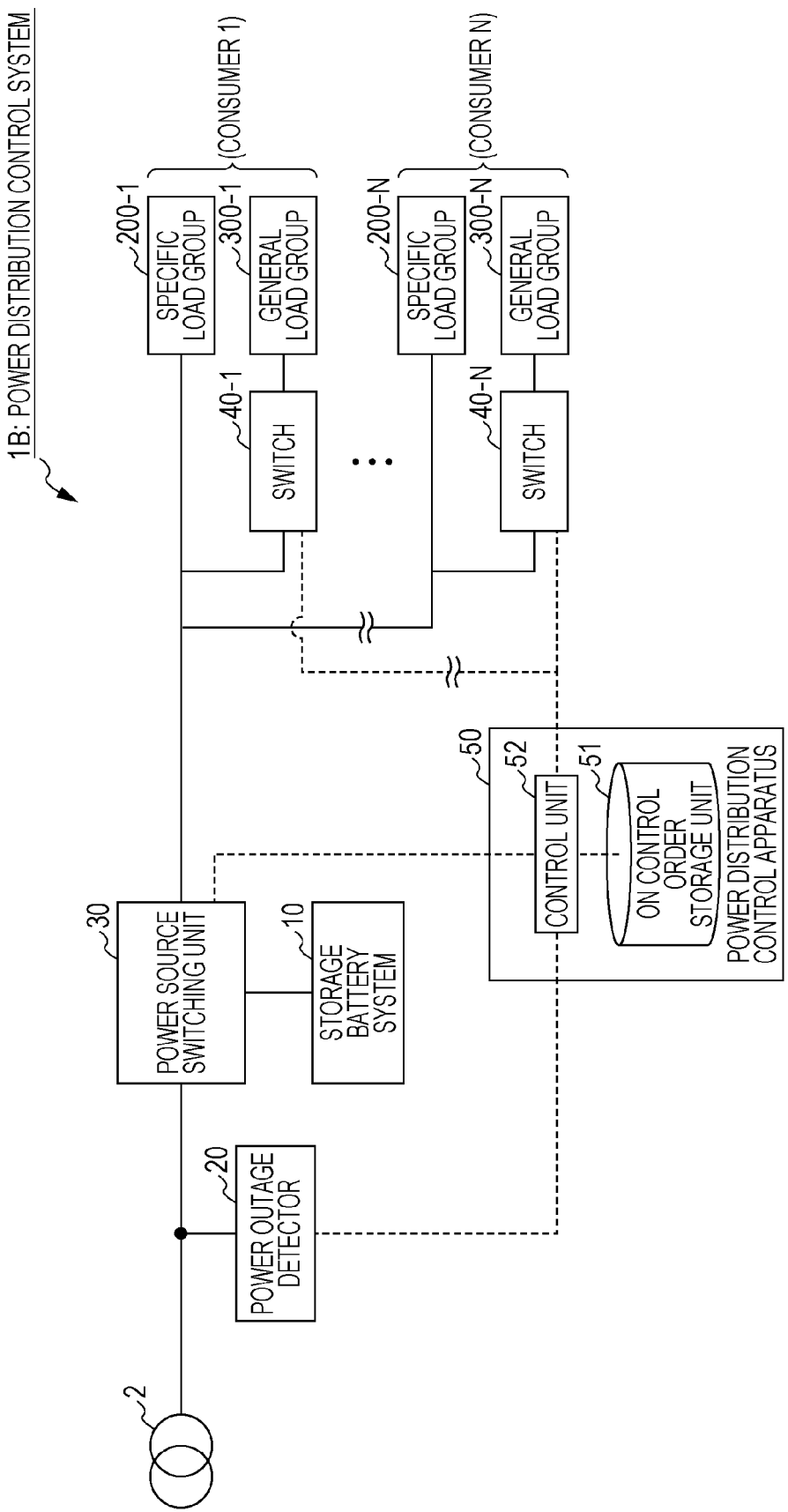
FIG. 8 illustrates a power distribution control system according to a third embodiment.

As illustrated in FIG. 8, according to the third embodiment, a power distribution control system 1B separates load groups used by consumers into specific load groups 200-1, . . . , 200-N and general load groups 300-1, . . . , and 300-N. The specific load groups 200-1, . . . , and 200-N are directly connected to the power source switching unit 30 without using the switches 40-1, . . . , and 40-N, respectively. In contrast, the general load groups 300-1, . . . , and 300-N are connected to the power source switching unit 30 via the switches 40-1, . . . , and 40-N, respectively. The other configurations of the power distribution control system 1B according to the third embodiment are the same as those of the power distribution control system 1 according to the first embodiment described above.

As described above, according to the power distribution control system 1B of the third embodiment, since the specific load groups 200-1, . . . , and 200-N are connected to the power source switching unit 30 without using the switches 40-1, . . . , and 40-N, electric power is distributed from the storage battery system to the specific load groups 200-1, . . . , and 200-N immediately after the power source of the load groups is switched from the commercial power source to the storage battery system 10.

Note that to prevent a voltage drop caused by an inrush current generated in the specific load groups 200-1, . . . , and 200-N immediately after the power source of the load groups is switched from the commercial power source to the storage battery system 10, it is desirable that the specific load be determined on the basis of the power supplying capability of the storage battery system.

According to the power distribution control system 1B of the third embodiment, the usability of the consumers can be ensured while preventing a voltage drop of the power supply path caused by an inrush current and stably supplying electric power.

Figure 9A:
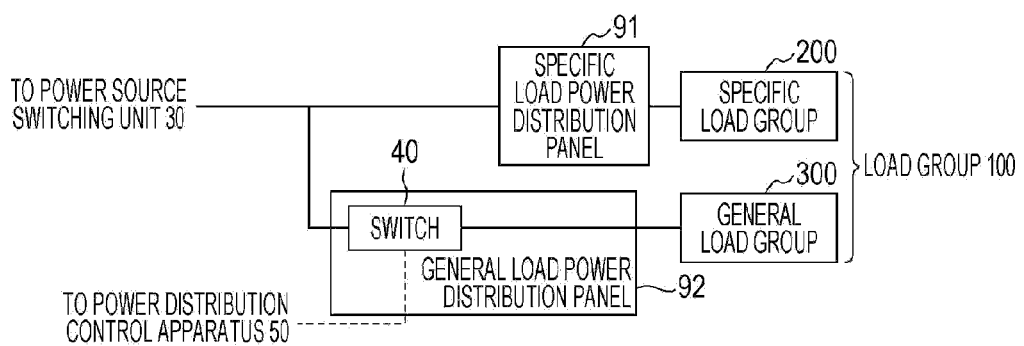
FIGS. 9A and 9B illustrate an example of installation of switches according to the third embodiment.
Figure 9B:
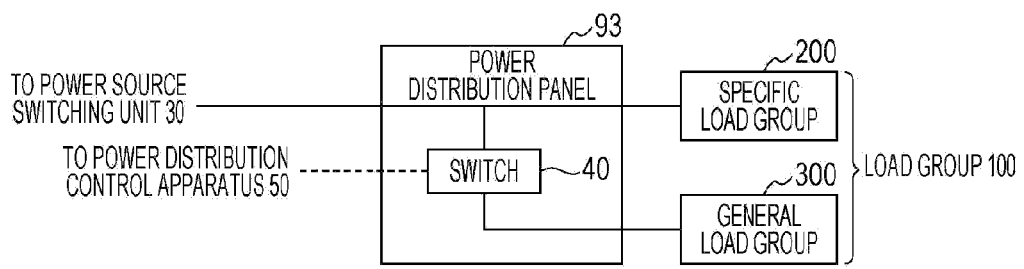

An installation example of the switches 40-1, . . . , and 40-N in the power distribution control system 1B is illustrated in FIGS. 9A and 9B.

As illustrated in FIG. 9A, a specific load power distribution panel 91 for the specific load group 200 and a general load power distribution panel 92 for a general load group may be provided, and the general load power distribution panel 92 may incorporate the switch 40.

Alternatively, as illustrated in FIG. 9B, a power distribution panel 93 may be provided without separating a panel for a specific load group from a panel for a general load group, and the power distribution panel may incorporate the switch 40.

4. Fourth Embodiment

A power distribution control system according to a fourth embodiment is described below. The power distribution control system performs open/close control on switches disposed in the power supply paths downstream of a power distribution panel on a house-to-house basis for each of the consumers. Note that the same numbering will be used in referring to configurations and operations of the third embodiment as is utilized in the above-described embodiments, and descriptions of the configurations and operations are not repeated.

As illustrated in FIG. 10, according to a power distribution control system 1C of the fourth embodiment, power supply paths located downstream of a power distribution panel 70-1 for a consumer 1 include switches 140-1, . . . , and 140-M. In addition, the power supply paths downstream of the switches 140-1, . . . , and 140-M are connected to load groups 400-1, . . . , and 400-M used by the consumer 1, respectively. Note that M is an integer greater than or equal to 2.

The switches 140-1, . . . , and 140-M open and close the power supply paths under the control of a house-to-house power distribution control unit 150 (described in more detail below).

Like the power outage detector 20 described in the first embodiment, a power outage detector 120 detects commercial power outage and recovery.

In addition, after detecting commercial power outage, the power outage detector 120 sends a message indicating the commercial power outage to a power source switching unit 130 (described in more detail below) and the house-to-house power distribution control unit 150. After detecting recovery of the commercial power, the power outage detector 120 sends a message indicating recovery of the commercial power to the power source switching unit 130 and the house-to-house power distribution control unit 150.

The power source switching unit 130 switches a power source for the load groups of the consumers between a commercial power source and the storage battery system 10.

More specifically, upon receiving a message indicating power outage from the power outage detector 120, the power source switching unit 130 switches the power source for the load groups of the consumers from the commercial power source to the storage battery system 10 and distributes the electric power supplied from the storage battery system 10 to the load groups of the consumers. In contrast, upon receiving a message indicating recovery of power from the power outage detector 120, the power source switching unit 30 switches the power source of for the load groups of the consumers from the storage battery system 10 to the commercial power source and distributes the electric power supplied from the commercial power source to the load groups of the consumers.

The house-to-house power distribution control unit 150 includes an ON control order storage unit 151 and a control unit 152. The house-to-house power distribution control unit 150 performs ON control and OFF control on each of the switches 140-1, ..., and 140-M provided for the load groups 400-1, ..., and 400-M, respectively.

Like the ON control order storage unit 51 of the power distribution control apparatus 50 according to the first embodiment, the ON control order storage unit 151 stores the positions of the switches 140-1, ..., and 140-M in the order in which the control unit 152 performs ON control on the switches 140-1, ..., and 140-M.

The control unit 152 performs ON control and OFF control on each of the switches 140-1, ..., and 140-M.

Figure 11:
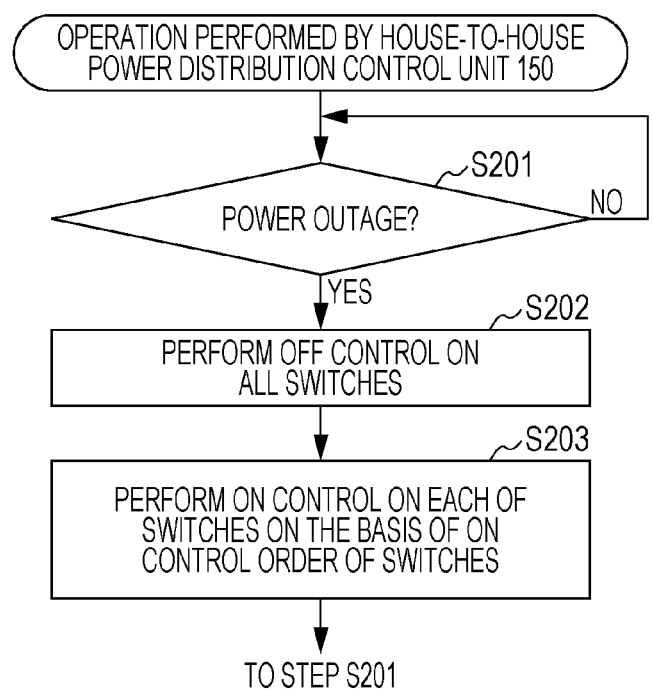
FIG. 11 is a flowchart of the operation performed by a control unit according to the fourth embodiment.

The operation performed by the control unit 152 is described in detail below with reference to a flowchart illustrated in FIG. 11.

Upon receiving a message indicating commercial power outage from the power outage detector 120 (S201: YES), the control unit 152 performs the OFF control on all the switches 140-1, ..., and 140-M (S202).

After performing OFF control on all the switches 140-1, ..., and 140-M (S202), the control unit 152 sequentially performs ON control on the switches 140-1, ..., and 140-M on the basis of the positions of the switches 140-1, ..., and 140-M in the ON control order stored in the ON control order storage unit 151 (S203).

Since the process in step S203 is the same as that in step S104 performed by the control unit 52 of the power distribution control apparatus 50 according to the first embodiment described above (refer to FIG. 3), detailed description of the process in step S203 is not repeated.

In addition, when the control unit 152 receives, from the power outage detector 120, a message indicating that the electric power is recovered during a period of time from a process subsequent to the process in step S201 to completion of the process in step S203 and if at least one of the switches 140-1, ..., and 140-M is in an OFF state, the control unit 152 performs ON control on all the switches that are in the OFF state.

As described above, according to the power distribution control system 1C of the fourth embodiment, for each of the consumers, the switches provided in the power supply paths downstream of the power distribution panel are subjected to open/close control performed by the house-to-house power distribution control unit on a house-to-house basis. Thus, according to the power distribution control system 1C of the fourth embodiment, electric power can be flexibly supplied to the load groups on a consumer basis and, thus, a voltage drop of the power supply path caused by an inrush current can be prevented. Thus, the electric power can be stably supplied.

5. Fifth Embodiment

A power distribution control system according to a fifth embodiment is described below. After detecting power outage, the power distribution control system separates the loads into the specific load and the general load. Upon receiving user's operation, the power distribution control system starts supplying power from the electricity storage system to a general load group. Note that the same numbering will be used in referring to configurations and operations of the fifth embodiment as is utilized in the above-described embodiments, and descriptions of the configurations and operations are not repeated.

Figure 12A:
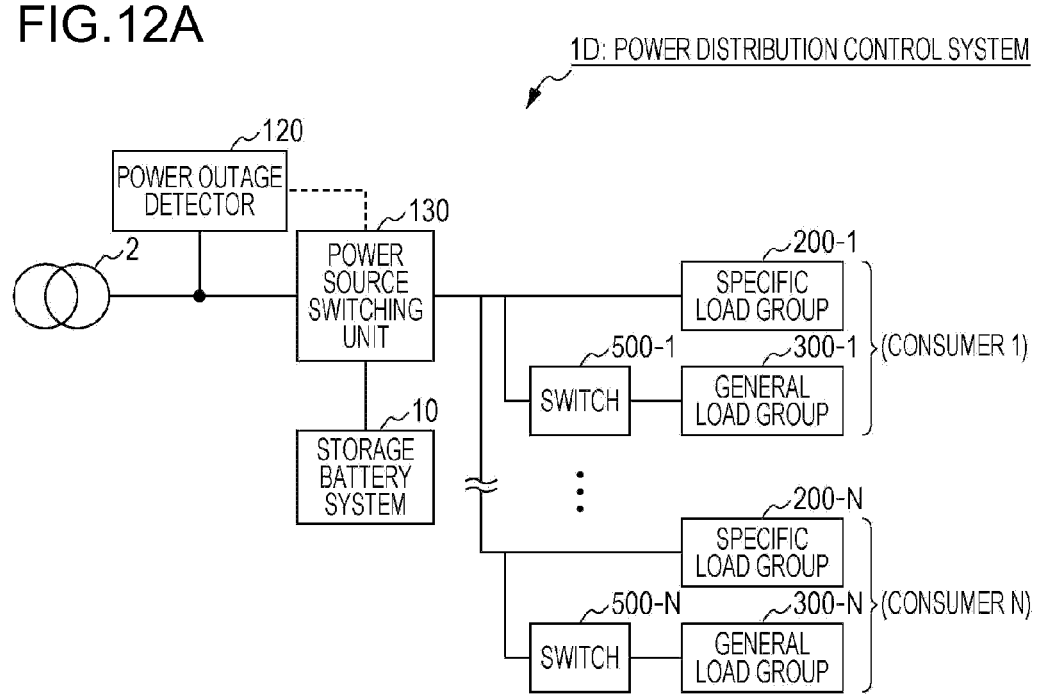
FIG. 12A illustrates a power distribution control system according to a fifth embodiment.

As illustrated in FIG. 12A, a power distribution control system 1D according to the fifth embodiment is configured by removing the power distribution control apparatus 50 from the power distribution control system 1B according to the third embodiment described above, providing the power outage detector 120 instead of the power outage detector 20, providing the power supply switching unit 130 instead of the power source switching unit 30, and providing switches 500-1, ..., and 500-N, each allowing for user's operation, instead of the switches 40-1, ..., and 40-N.

In addition, the power distribution control system 1D distributes electric power of the commercial power source and the storage battery system to the specific load groups 200-1, ..., and 200-N and the general load groups 300-1, ..., and 300-N using the power supply paths formed from a single-phase three-wire distribution line.

Figure 12B:
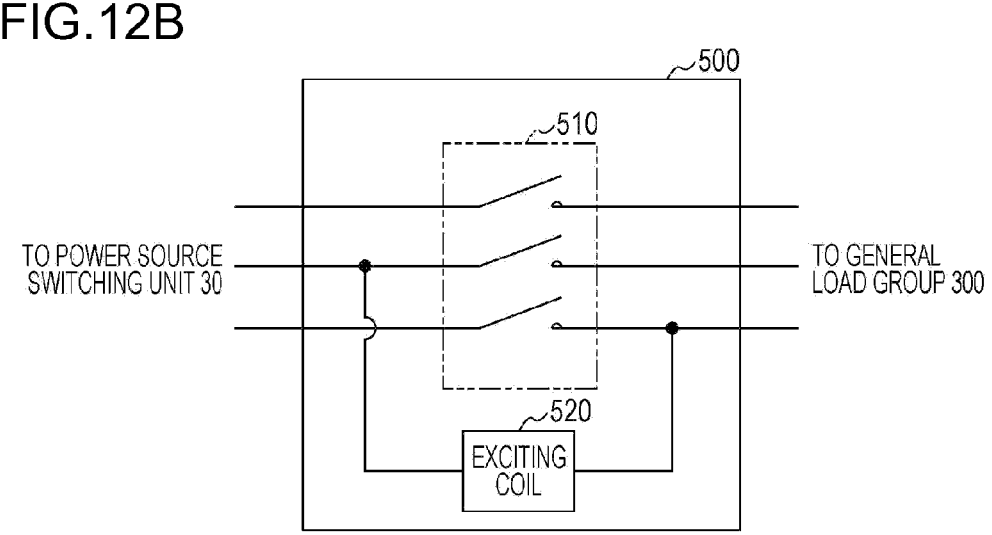
FIG. 12B illustrates a switch according to the fifth embodiment.

The configuration of each of the switches 500-1, ..., and 500-N is described with reference to FIG. 12B.

A switch 500 includes a contact point portion 510 and an exciting coil portion 520.

The contact point portion 510 opens and closes the power supply path formed as a single-phase three-wire distribution line.

When an electric current flows in the exciting coil portion 520, the contact point portion 510 is in a closed state (a state in which electric power is delivered to a general load group) due to the excitation effect of the exciting coil portion 520. In contrast, when an electric current does not flow in the exciting coil portion 520, the contact point portion 510 is in an open state (a state in which electric power is not delivered to the general load group).

In addition, when the user performs an ON operation, such as pressing a button, the contact point portion 510 enters a closed state. In contrast, when the user does not perform an ON operation, the contact point portion 510 enters an open state.

Both ends of the exciting coil portion 520 are connected to the power supply path formed from a single-phase three-wire distribution line and, thus, a closed circuit is formed. The exciting coil portion 520 opens and closes the contact point portion 510 by the excitation effect.

More specifically, when an electric current flows in the exciting coil portion 520, the exciting coil portion 520 places the contact point portion 510 in a closed state using the excitation effect. In contrast, when no electric current flows in the exciting coil portion 520, the exciting coil portion 520 places the contact point portion 510 in an open state.

Note that by incorporating, therein, a rectifier (not illustrated) that converts an AC current into a DC current flowing in the power supply path, the exciting coil portion 520 AC-drives the switch 500.

The operation performed by the switch 500 is described next with reference to FIGS. 13 and 14.

FIG. 13A illustrates a state in which electric power from the commercial power source is delivered, that is, electric power from the commercial power source is supplied to the load group. At that time, since an electric current continuously flows in the exciting coil portion 520, the contact point portion 510 maintains a closed state (the exciting coil portion 520: excited state).

FIG. 13B illustrates a state in which electric power from the commercial power source is stopped after the state in which electric power from the commercial power is delivered (refer to FIG. 13A). In FIG. 13B, since no electric current flows in the exciting coil portion 520, the contact point portion 510 enters an open state (the exciting coil portion 520: non-excited state).

FIG. 13C illustrates a state in which the storage battery system 10 starts supplying electric power after supply of electric power from the commercial power source is stopped (FIG. 13B). In FIG. 13C, since no electric current flows in the exciting coil portion 520, the contact point portion 510 maintains the open state (the exciting coil portion 520: non-excited state), and electric power from the storage battery system 10 is not delivered.

FIG. 14A illustrates a state in which the user performs an ON operation after the storage battery system 10 starts supplying electric power (refer to FIG. 13C). In FIG. 14A, the contact point portion 510 enters the closed state due to the ON operation performed by the user, and electric power from the storage battery system 10 is delivered.

FIG. 14B illustrates a state in which electric power from the storage battery system 10 is delivered due to the ON operation performed by the user (refer to FIG. 14A) and, thus, an electric current continuously flows in the exciting coil portion 520 so that the contact point portion 510 maintains the closed state (the exciting coil portion 520: excited state).

The operation performed by the switch 500 when commercial power is lost and, thus, the power source to the load group is switched from the commercial power source to the storage battery system has been described above. The operation performed by the switch 500 when the power source for the load group is switched from the storage battery system to the commercial power source is the same as that described above.

Note that as illustrated in FIG. 14C, the switch 500 may further include indicator lamps 530 and 540 to notify the user of a power supply state of the power source and a power delivery state.

More specifically, if supply of electric power from the commercial power source or the storage battery system to a load group is started, the electric power is supplied to the indicator lamp 530 and, thus, the indicator lamp 530 is lit. Since the indicator lamp 530 is lit, the user is aware that electric power is being supplied from the commercial power source or the storage battery system 10 to the load group and, thus, the user can perform an ON operation on the switch 500. In addition, if the electric power is delivered from the commercial power source or the storage battery system to the load group, the electric power is supplied to the indicator lamp 540 and, thus, the indicator lamp 540 is lit. Since the indicator lamp 540 is lit, the user can be aware that the electric power is being delivered from the commercial power source or the storage battery system to the load group.

Note that a method for notifying the user of the power supply state and the power delivery state is not limited to a method using an indicator lamp. For example, a variety of methods, such as a method using an alarm or a display, may be employed.

As described above, the power distribution control system 1D of the fifth embodiment does not include a power distribution control apparatus, and ON control is performed on the switch 500 through an operation performed by a user for each of the consumers after supply of electric power from the storage battery system is started. Consequently, according to the power distribution control system 1D of the fifth embodiment, the usability of the consumers can be ensured while preventing a voltage drop of the power supply path caused by an inrush current and stably supplying electric power.

While description of the above example has been made with reference to supply of electric power to a load group using a single-phase three-wire distribution line, the power distribution control system 1D according to the fifth embodiment is not limited thereto. The switch 500 may be modified, and electric power may be supplied to the load group using a single-phase system.

6. Sixth Embodiment

A power distribution control system according to a sixth embodiment is described below. In the power distribution control system, power supply paths branch off to the consumers and, at a downstream end of each of the power supply paths, further branch off to specific load groups of any number and general load groups of any number at a position downstream. A switch is provided in each of the power supply paths. Open/close control is performed on each of the switches. Note that the same numbering will be used in referring to configurations and operations of the sixth embodiment as is utilized in the above-described embodiments, and descriptions of the configurations and operations are not repeated.

Figure 15:
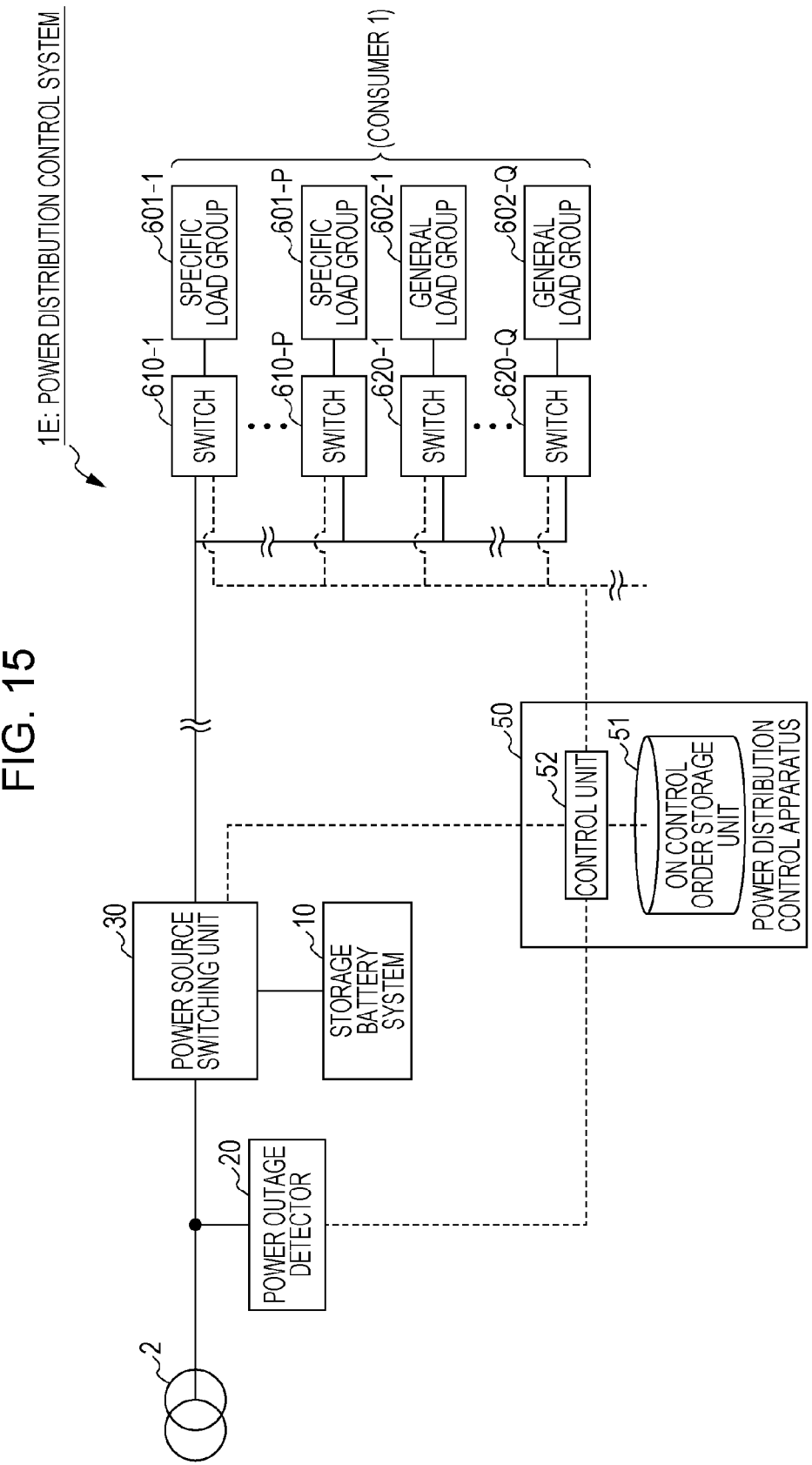
FIG. 15 illustrates a power distribution control system according to a sixth embodiment.

As illustrated in FIG. 15, in a power distribution control system 1E according to the sixth embodiment, power supply paths branch off from the downstream end of a power supply path for a consumer 1. Each of the power supply path has one of switches 610-1, . . . , and 610-P and switches 620-1, . . . , and 620-Q disposed therein. In addition, specific load groups 601-1, . . . , and 601-P used by the consumer 1 are connected to the power supply paths located downstream of the switches 610-1, . . . , and 610-P, respectively. Furthermore, general load groups 602-1, . . . , and 602-Q used by the consumer 1 are connected to power supply paths located downstream of the switches 620-1, . . . , and 620-Q, respectively. Note that each of P and Q is any number.

Each of the switches 610-1, . . . , and 610-P opens and closes the corresponding power supply path under the control of the power distribution control apparatus 50. In addition, each of the switches 620-1, . . . , and 620-Q opens and closes the corresponding power supply path under the control of the power distribution control apparatus 50.

The configurations of the power distribution control system 1E according to the sixth embodiment are the same as those of the power distribution control system 1 according to the first embodiment except for the above-described configurations.

As described above, according to the power distribution control system 1E of the sixth embodiment, ON control is sequentially performed on the switches disposed in power supply paths of specific load groups of any number and general load groups of any number for each of the consumers when supply of electric power from the storage battery system to the load groups is started.

Note that the specific load groups and the general load groups may be determined as illustrated in FIG. 16A.

In FIG. 16A, for example, definition is made so that lighting equipment of a room A is included in a specific load group and lighting equipment of rooms other than the room A is included in a general load group.

In addition, some of the load groups that represent home appliances may be members of the specific load group, and the other load groups may be members of the general load group.

For example, as illustrated in FIG. 16A, for a refrigerator-freezer, a load group required for the operation performed by an air blower may be defined as a specific load group, and a load group required for the operation performed by a compressor may be defined as a general load group. However, the definitions of a specific load group and a general load group for the load groups of a refrigerator-freezer are not limited thereto. For example, the load groups related to a freezing and refrigerating function of the refrigerator-freezer may be defined as a specific load group, and the load groups related to the other functions of the refrigerator-freezer, such as interior lighting, may be defined as a general load group.

In addition, as illustrated in FIG. 16A, for example, for an air conditioner, a load group required for the operation performed by an indoor unit is defined as a specific load group, and a load group required for the operation performed by an outdoor unit is defined as a general load group.

By defining a specific load group and a general load group for the load groups that constitute a home appliance and providing a switch for each of the power supply paths of each of the specific load group and the general load group in this manner, power source control can be performed independently for each of the specific load group and the general load group.

FIG. 16B illustrates an example of a method for determining the order in which electric power is supplied from the storage battery system to each of the specific load group and the general load group, that is, the order in which the switches are subjected to ON control performed by the control unit 52 of the power distribution control apparatus 50.

As illustrated in FIG. 16B, when the control unit 52 performs ON control on the switches, the switches may be subjected to ON control so that electric power is supplied to the load groups in the following order: "all the specific load groups", "the general load groups of the air conditioner", and "the other general load groups".

Another example is described below.

When a refrigerator-freezer is defined as a specific load and if the other appliances are defined as general loads, electric power may be supplied from the storage battery system to the loads in the following order: the general load and, subsequently, the specific load. In such a case, it is desirable that an interval from the occurrence of power outage to the ON control of the switch corresponding to the general load be several seconds. In addition, it is desirable that an interval from the occurrence of power outage to the ON control of the switch corresponding to the specific load be several minutes.

As described above, according to the power distribution control system 1D of the fifth embodiment, a voltage drop of the power supply path caused by an inrush current can be prevented and, thus, electric power can be stably supplied.

In addition, electric power is more flexibly applied to any number of specific load groups and any number of the general load groups for each of the consumers.

7. Seventh Embodiment

In recent years, commercial electricity supply has been disrupted due to a decrease in the electric-generating capacity caused by a shortage of resources and shutdown of power plants arising from disasters.

To address such an issue, the present inventors discovered that the insufficient commercial electricity supply can be eased by performing control to save the commercial power, that is, control to stop supplying some of the loads and supply electric power from the storage battery system to the load group in accordance with the tightness of supply of commercial electricity.

According to the seventh embodiment, a power distribution control system that performs control to save commercial power in accordance with the tightness of supply of commercial electricity is provided.

Figure 17:
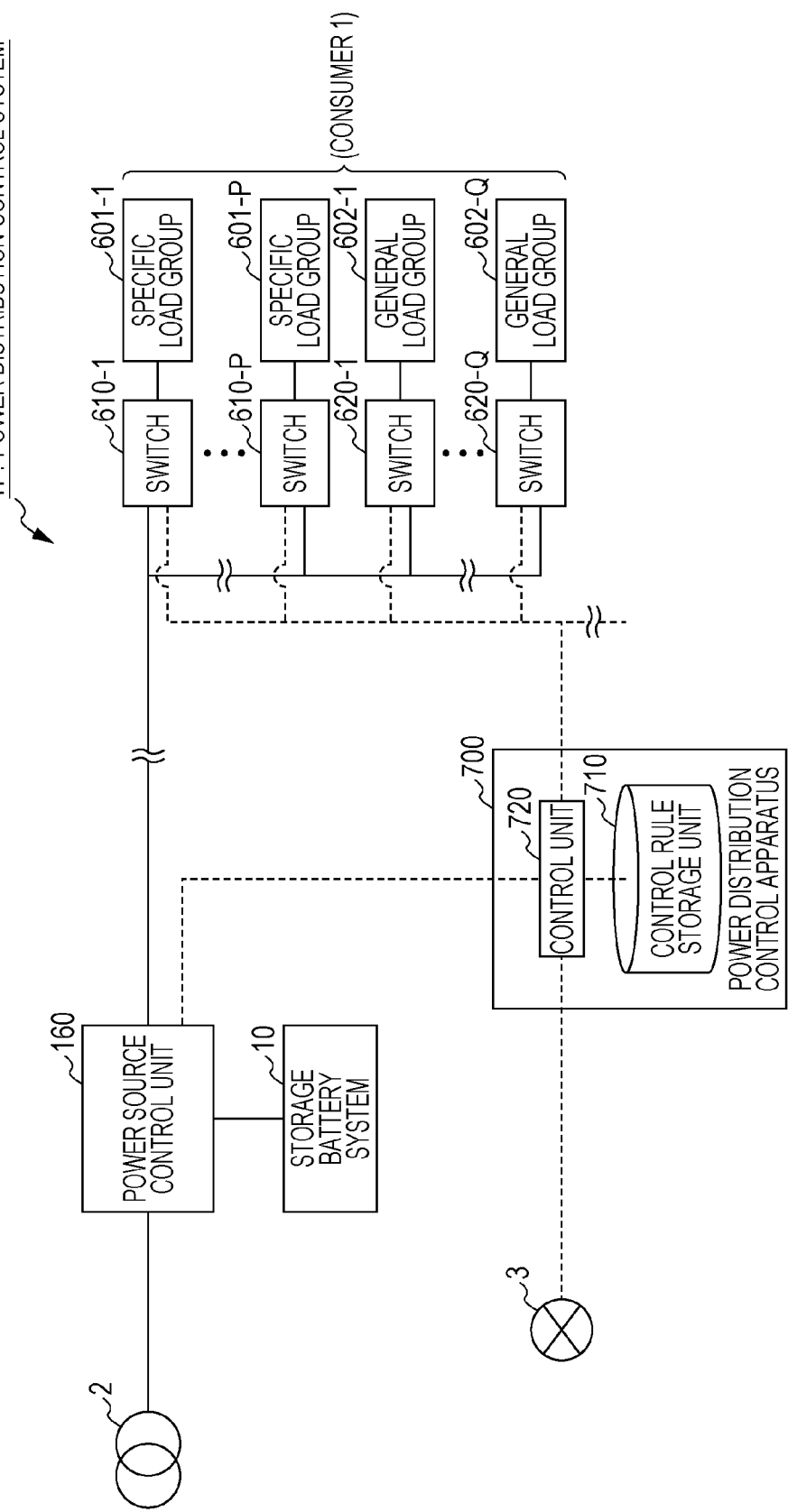
FIG. 17 illustrates a power distribution control system according to a seventh embodiment.

A power distribution control system 1F according to the seventh embodiment is described with reference to FIG. 17. Note that the same numbering will be used in referring to configurations and operations of the seventh embodiment as is utilized in the above-described embodiments, and descriptions of the configurations and operations are not repeated.

The power distribution control system 1F according to the seventh embodiment is configured by removing the power outage detector 20 from the power distribution control system 1E according to the sixth embodiment described above, providing a power supply control unit 160 instead of the power source switching unit 30, and providing a power distribution control apparatus 700 instead of the power distribution control apparatus 50.

Note that in the third and sixth embodiments, a load that requires fast power recovery is referred to as a "specific load", and a load other than the specific load is referred to as a "general load". In contrast, according to the seventh embodiment, a load that has a high priority for receiving electric power is defined as a "specific load" and a load other than the specific load is defined as a "general load".

The power source control unit 160 supplies the electric power from the electric power source and the electric power from the storage battery system 10 to the load groups of each of consumers under the control of the electric power distribution control apparatus 700 described in more detail below.

The power distribution control apparatus 700 includes a control rule storage unit 710 and a control unit 720.

The control rule storage unit 710 stores rules for control performed by the control unit 720 in accordance with a power saving request received from a supervisor of the commercial power. The control rule storage unit 710 is described in more detail below.

Upon receiving the power saving request from the supervisor of the commercial power via a network 3, the control unit 720 accesses the control rule storage unit 710 and controls the power source control unit 160, the switches 610-1, . . . , and 610-P, and the switches 620-1, . . . , and 620-Q in accordance with the power saving request. In addition, upon receiving a message indicating cancellation of the power saving request from the supervisor of the commercial power via the network 3, the control unit 720 cancels the control performed on the power source control unit 160, the switches 610-1, . . . , and 610-P, and the switches 620-1, . . . , and 620-Q in accordance with the power saving request.

A particular example of the power saving request received from the supervisor of the commercial power and a control rule for the control unit 720 selected in accordance with the power saving request received from the supervisor of the commercial power is described below.

In the particular example, the power distribution control apparatus 700 receives a power saving request message indicating one of three levels of power saving from the highest, that is, "HIGH", "MEDIUM", and "LOW", in accordance with the tightness of supply of the commercial power.

Figures 18A, 18B:
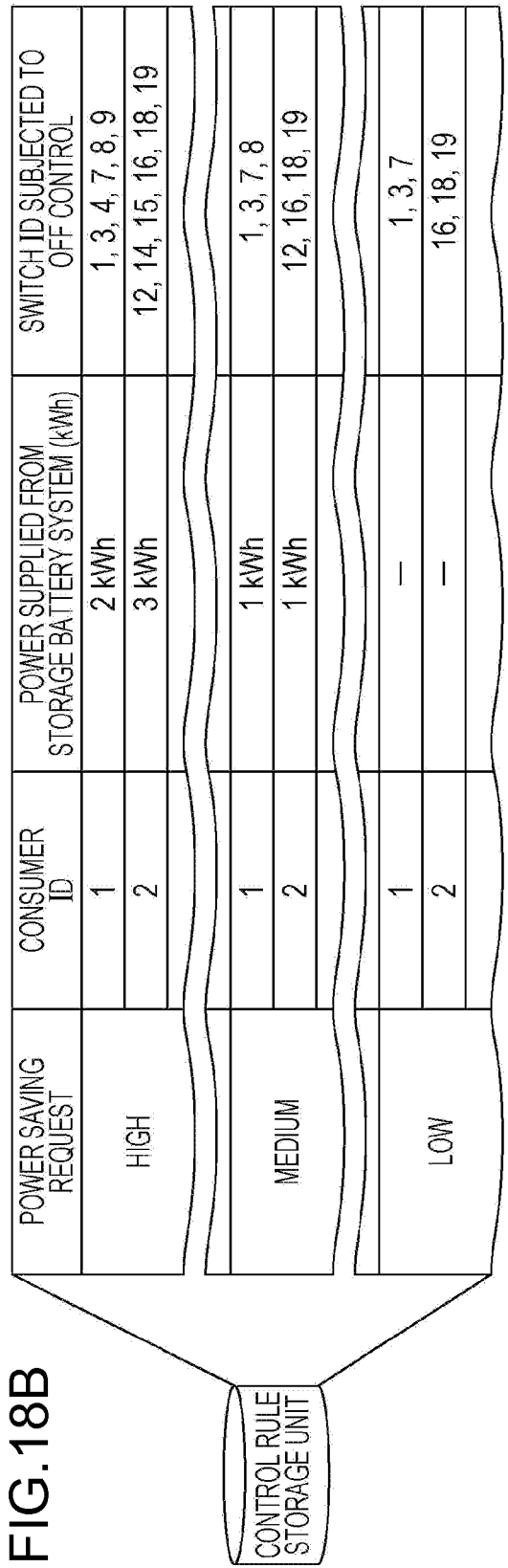
FIG. 18A illustrates an example of a power saving method according to the seventh embodiment.
FIG. 18B illustrates an example of information stored in the control rule storage unit according to the seventh embodiment.

In addition, as illustrated in FIG. 18A, a power saving method is determined for each of the following three power saving requests: "HIGH", "MEDIUM", and "LOW".

As illustrated in FIG. 18A, a rule is set as follows: (i) if the power saving request is "HIGH", the air conditioner and lighting equipment are all turned off for a consumer having an ID of 1 (note that the luminance of the lighting equipment may be decreased instead of turning off the lighting equipment). In addition, electric power of 2 (kWh) is supplied from the storage battery system to the load groups of the consumer having an ID of 1. (ii) if the power saving request is "MEDIUM", the general loads of the air conditioner and the refrigerator-freezer are turned off for a consumer having an ID of 1. In addition, electric power of 1 (kWh) is supplied from the storage battery system to the load groups of the consumer having an ID of 1. (iii) if the power saving request is "LOW", the general loads of the air conditioner are turned off for a consumer having an ID of 1 (or the set temperature of the air conditioner is decreased).

Note that the power distribution control system has a configuration in which all the loads are switched to the same power source (the utility grid or the battery) (i.e., the power distribution control system includes a power control unit). However, the power distribution control system may have a switcher (a power control unit) that independently performs power source switching (to the utility grid or the battery) for each of the loads and further have a switch that turns on/off supply of power from a selected power source for each of the loads. According to such a configuration, when electricity supplied from the power source is tight, a load to which electric power is supplied from the utility grid and a load to which electric power is supplied from the battery can be prepared. Thus, the sufficient power can be supplied to all the loads, and the peak of the electric power can be reduced by the power supplied from the battery. Note that each of the load to which electric power is supplied from the system and the load to which electric power is supplied from the battery may be formed from a plurality of groups. Note that this configuration may represent the configuration for a housing complex (e.g., the load is residence-based) or a residence (e.g., the load is circuit-based).

FIG. 18B illustrates an example of the information stored in the control rule storage unit 710 of the particular example.

As illustrated in FIG. 18B, the control rule storage unit 710 stores the rules of the control performed by the control unit 720 in accordance with the three types of power saving request, that is, "HIGH", "MEDIUM", and "LOW".

More specifically, the control rule storage unit 710 includes a "power saving request demand" field, a "consumer ID" field, an "switch ID subjected to OFF control" field, and a "power supplied from storage battery system (kWh)" field. Thus, the control rule storage unit 710 stores ID information regarding a switch that is subjected to OFF control in accordance with the power saving requests "HIGH", "MEDIUM", and "LOW" for each of the consumers. In addition, the control rule storage unit 710 stores the power supplied from the storage battery system to the load group of a consumer in accordance with the power saving requests "HIGH", "MEDIUM", and "LOW" for each of the consumers.

The operation performed by the control unit 720 in the particular example is described below.

For example, in FIG. 18B, upon receiving a power saving request of "HIGH" from the supervisor of the commercial power, the control unit 720 performs OFF control on the switches having IDs of 1, 3, 4, 7, 8, and 9 so as to stop supplying electric power to the air conditioner and lighting equipment.

Thereafter, the control unit 720 further instructs the power source control unit 160 to supply electric power of 2 (kWh) from the storage battery system 10 to the consumer 1.

At that time, upon receiving an instruction from the control unit 720, the power source control unit 160 instructs the storage battery system 10 to supply electric power of 2 (kWh) and distributes the electric power supplied from the storage battery system 10 to the load group in addition to the electric power provided from the commercial power source.

Note that in FIG. 18B, upon receiving a power saving request of "MEDIUM" or "LOW", the control unit 720 similarly performs OFF control on the switches corresponding to the power saving request of "MEDIUM" or "LOW" and control of supply of electric power from the storage battery system.

In the description above, the operation is performed for the consumer 1. Like the control performed for the consumer 1, the control unit 720 performs OFF control on the switches and control of power supply from the storage battery system 10 to the load group in accordance with the information stored in the control rule storage unit 710 for the other consumers.

Another particular example of the power saving request from the supervisor of the commercial power and a control rule used by the control unit 720 in accordance with the power saving request received from the supervisor of the commercial power are described below.

Like the above-described particular example, the supervisor of the commercial power sends, to a house-to-house distribution control apparatus, a power saving request indicating one of three levels of power saving from the highest, that is, "HIGH", "MEDIUM", and "LOW", in accordance with the tightness of supply of the commercial power.

At that time, for example, the target of power saving may be set as follows: commercial electricity of 5 (kWh) is saved in response to a power saving request of "HIGH" received from the supervisor of the commercial power, commercial electricity of 3 (kWh) is saved in response to a power saving request of "MEDIUM", and commercial electricity of 1 (kWh) is saved in response to a power saving request of "LOW".

Thereafter, the switches to be subjected to the OFF control and the amount of electricity supply from the storage battery system 10 to the load group may be determined in accordance with the set power saving target.

Note that while the description above has been made with reference to the control unit 720 that receives, via the network 3, a power saving request and a cancellation message for the power saving request in accordance with the tightness of commercial power source from the supervisor of the commercial power (e.g., an electric power company), the control according to the present embodiment is not limited thereto.

For example, the hours for which power consumption presumably increases (e.g., the day time in summer and night time in winter) are determined to be a tight commercial power time in advance. Thereafter, the control unit 720 may perform control in accordance with the information stored in the control rule storage unit 710 during the tight commercial power time.

Figure 19:
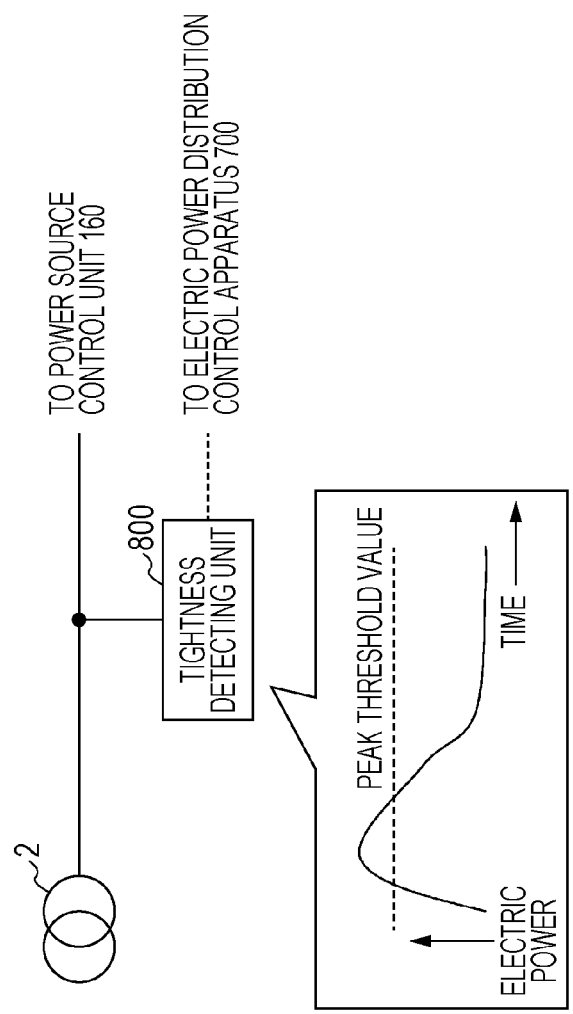
FIG. 19 illustrates a tightness detecting unit according to the seventh embodiment.

Alternatively, for example, as illustrated in FIG. 19, the power distribution control system 1F may further include a tightness detecting unit 800, and the tightness detecting unit 800 may monitor the electric energy supplied from the commercial power source to the load group to detect the tightness of supply of commercial electricity.

For example, as illustrated in FIG. 19, the tightness detecting unit 800 may preset a peak threshold value. If the electric energy supplied from the commercial power source to the load group exceeds the preset peak threshold value, the tightness detecting unit 800 may determine that supply of commercial electricity is tight.

Note that the tightness detecting unit 800 may preset a plurality of peak threshold values to detect the tightness of supply of commercial electricity.

Note that according to the present invention, to detect the tightness of supply of commercial electricity, the following methods can be employed. That is, a message indicating the tightness of supply of commercial electricity may be received from an electric power company, a power producer and supplier, or an aggregator. Alternatively, for buildings having a high-voltage substation facility installed therein (including a condominium building having a collective-access high-voltage power receiving system), the tightness of electrical power need for the building may be detected. For houses, the tightness of supply of electricity may be detected by comparing the electric current value that regulates supplied electricity set in a device (e.g., a smart meter, an electric power meter, or a power distribution panel) in each of the houses with an actual value.

According to the power distribution control system 1F of the seventh embodiment, control to save commercial electricity (e.g., stoppage of supply of electricity to some of the loads and supply of electricity from the storage battery system to the load group) is performed in accordance with the tightness of supply of commercial electricity. As a result, according to the power distribution control system 1F of the seventh embodiment, the tightness of supply of commercial electricity can be eased.

8. Eighth Embodiment

According to an eighth embodiment, the following power distribution control system is described. That is, the power distribution control system performs control on a storage battery system and open/close control on switches provided in power supply paths that branch off to the specific load groups of any number and the general load groups of any number when commercial electricity is lost or supply of electricity is tight. Note that the same numbering will be used in referring to configurations and operations of the eighth embodiment as is utilized in the above-described embodiments, and descriptions of the configurations and operations are not repeated.

Figure 26:
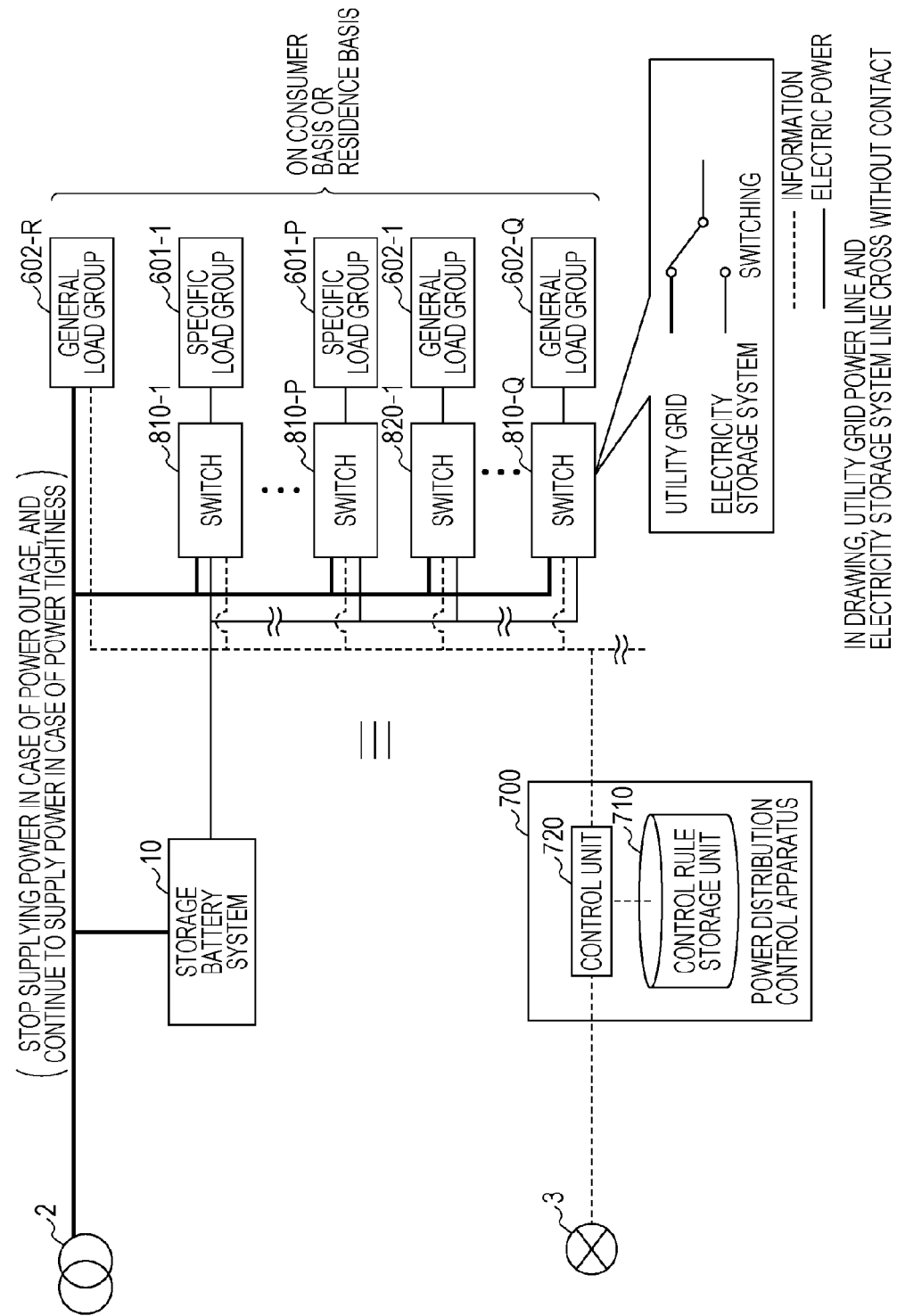
FIG. 26 illustrates a power distribution control system according to an eighth embodiment.

FIG. 26 illustrates a configuration in which each of switches 810-1, 810-P, 820-1, and 820-Q has a power source switching function. Thus, the storage battery system 10, specific load groups 601-1 and 601-P, and general load groups 602-1, 602-Q, and 602-R connected to the switches are controlled.

In the eighth embodiment, as can be seen from the comparison with mainly, FIG. 15, the general load group 602-R differs from that in FIG. 15 in that it is directly connected to the power distribution network 2, and the function of the power source switching unit is incorporated into each of the switches. The eighth embodiment is described in detail below.

A battery is installed for each of a housing complex, a building, or a house. A plurality of batteries may be installed for each of a housing complex, a building, or a house. Each of the switches switches electric power between the electric power from the power distribution network 2 (a utility grid) and the electric power from the storage battery system 10 and supplies the electric power to the general load or the specific load. Note that at the time of switching, supply of power is turned off due to disconnection from the storage battery system 10 (although a switching time is considerably short, the time required for stopping and resuming the operation performed by an apparatus is included).

Even among the general loads, supply of power to the general load that is directly connected to the utility grid is stopped in case of power outage. In contrast, when supply of the electricity is tight, electric power is continuously supplied. Examples of such a general load include appliances having a high electric load (high power consumption and a high inrush current), such as an air conditioner and a laundry machine. When supply of the electricity is tight, the power consumption is reduced by turning on and off the air conditioner and controlling the temperature setting of the air conditioner. The means for turning on and off the air conditioner and controlling the temperature setting of the air conditioner on the basis of electricity tightness information may be defined as air conditioning means and is prepared. Thereafter, the air conditioning means may be realized as part of the power allocation control apparatus.

The general load connected to the storage battery system 10 via the switch and the specific load lose power when the power source is switched from a utility grid to the storage battery system 10. The general loads connected to the storage battery system 10 correspond to, for example, a television set and an information and communication device (e.g., a router, a telephone, or a PC). The specific loads correspond to, for example, a refrigerator. Since fluctuation of the electrical power need for operating such devices is relatively low, information regarding a period of time during which the battery can discharge electricity and an amount of electricity to be saved when supply of the electricity is tight can be easily obtained by measuring electricity consumed for a predetermined period of time. Thus, the information can be easily provided to the electric power company.

The switches are controlled by the above-described power distribution control apparatus 50. The power distribution control apparatus 50 includes an ON control order storage unit 51 that stores the control rule used to control the switches and the control unit 52 that controls the switches on the basis of the ON control rule.

The ON control rule is the same as that described above. For example, the power source of the general loads having a television set and an information and communication device connected thereto is switched from the utility grid to the storage battery system 10 by controlling the switches. Through the switching, the operation of the devices are stopped. A period of time required for normally resuming the operation of the device is less than 1 minute (including a switching delay of the switch). For example, the period of time is greater than or equal to several milliseconds and less than 60 seconds.

These devices are automatically powered on after the power is recovered. The devices do not include appliances having a large inrush current or large power consumption (e.g., a refrigerator and a rice cooker).

In addition, by controlling the switch for a refrigerator (a specific load), the power source is switched from the utility grid to the storage battery system 10. To prevent an inrush current, a switching timing of the switch is delayed so as to be after that for a general load by a predetermined period of time from the time the operation of the refrigerator stops to the time the operation resumes normally. Thus, the predetermined period of time (including a switching delay time of the switch) is greater than or equal to 1 minute. For example, the predetermined period of time is greater than or equal to 1 minute and less than or equal to 10 minutes. In addition to a refrigerator, this may apply to a rice cooker.

The above-described switching operation of the switch starts when a power outage message is received or when a tight electricity supply message is received. The switches may be incorporated into a unit such as a power distribution panel, a battery, or a controller. In addition, according to the present embodiment, electric power is supplied to the switches and the power allocation control system when power is lost, when power is supplied normally, and when supply of electricity is tight. Furthermore, the system configuration described above may represent the internal configuration for a housing complex or a building (consumer-based) or a residence (residence-based).

Note that in terms of discharge from the battery, by randomly delaying the times of discharge from the battery to the residences (by performing a discharge start time controlling process), the sum of discharge amounts in the housing complex (or a lot for many houses) consisting of many residences can be easily made constant. By making the amount of discharge in a housing complex (or a lot for many houses) constant, a demand response and the effect of reduction in power consumption at a peak cut time can be easily committed to the residents. In addition, by performing the discharge start time controlling process at predetermined intervals (e.g., every 30 minutes), a change in a planned time at which supply of electricity from the battery ends, which is caused by a variation of load, can be accepted. The planned time at which supply of electricity from the battery ends can be calculated using the current battery level and an amount of discharge for a predetermined period of time, for example, using the power usage of the load and an amount of discharge of the battery for 30 minutes. In addition, by measuring the discharge amount of the battery and SOC for each of the residences, the total amount of discharge for the housing complex can be observed. Furthermore, the battery can be charged in the middle of the night in which the electric power rate is low.

According to the power distribution control system 1G of the eighth embodiment, control to save the commercial electricity is performed in accordance with the tightness of supply of the commercial electricity. That is, supply of electric power to some of the loads is stopped, and electric power is supplied from the storage battery system to the load group in accordance with the tightness of supply of the commercial electricity. In addition, since the power distribution network 2 has a general load group directly connected thereto without using a switch, the general load group can continuously receive a certain amount of electricity from the power distribution network 2 even when supply of electricity is tight. As a result, according to the power distribution control system 1G of the eighth embodiment, the tightness of supply of commercial electricity can be eased.

9. Modifications

The systems and apparatuses described in the above embodiments may be modified in the following manner.

Note that the same numbering will be used in referring to configurations and operations of the following modifications as is utilized in the above-described embodiments, and descriptions of the configurations and operations are not repeated.

(1) In the power distribution control systems of the above-described embodiments, the power distribution control apparatus (or the house-to-house power distribution control unit) may provide, to a terminal which each of the consumers can access, information regarding ON control and OFF control performed on each of the switches, that is, information regarding supply of electricity to each of the load groups corresponding to the switches.

As a particular example, the case in which the power distribution control apparatus 50A according to the second embodiment described above provides information regarding ON control and OFF control performed on each of the switches to one of the consumers is described below with reference to FIG. 20.

A display unit 4 allows the consumer to view information displayed thereon. The display unit 4 displays information received from the power distribution control apparatus 50A.

For example, the power distribution control apparatus 50A may provide, to the display unit 4, information indicating the progress of the ON control performed on the switches.

Figure 20:
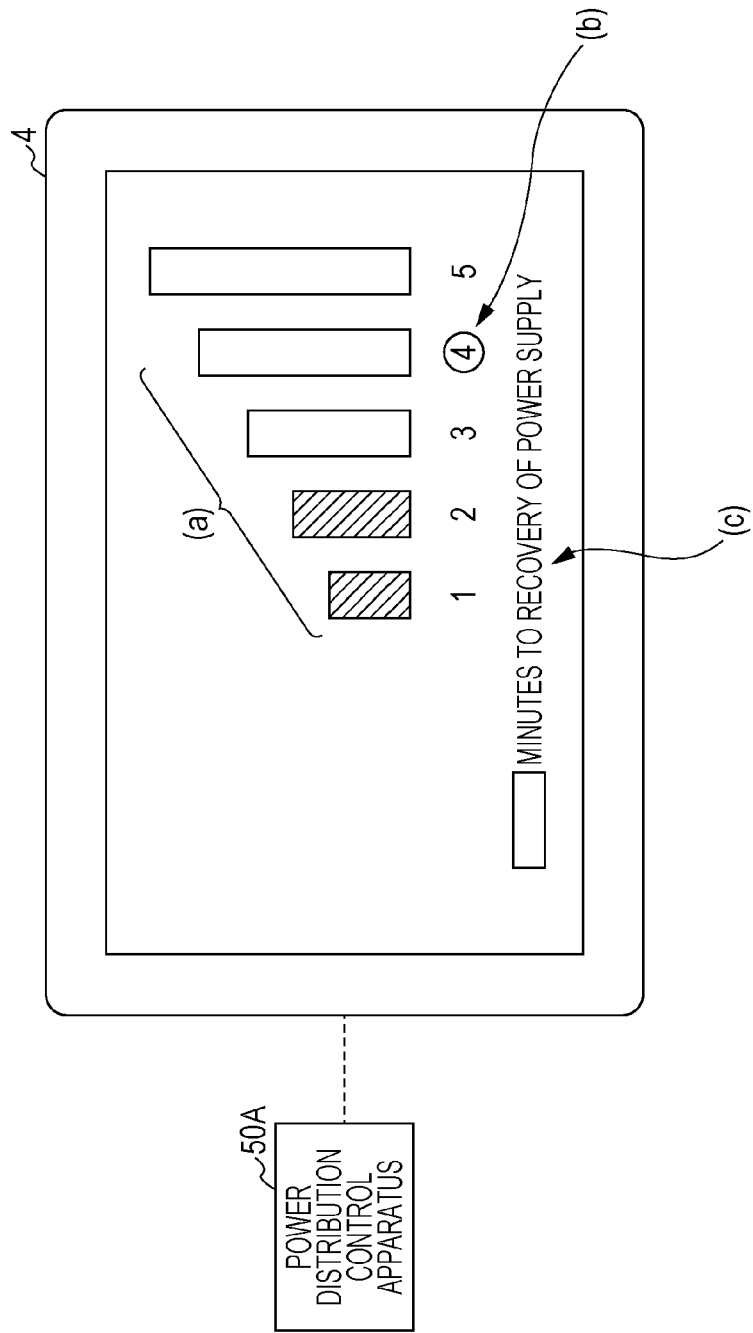
FIG. 20 illustrates an example of information regarding power distribution control according to modification (1)

Thereafter, the display unit 4 may display the information received from the power distribution control apparatus 50A thereon, as illustrated in a section (a) of FIG. 20, for example.

As illustrated in the section (a) of FIG. 20, in the power distribution control apparatus 50A, the ON control order positions from "1" to "5" are determined, and the ON control is completed for the switches having ON control order positions of "1" and "2". That is, in the section (a) of FIG. 20, supply of electricity from the storage battery system 10 to the consumers who belong to the groups for ON control order positions of "1" and "2" has already been started.

In addition, for example, the power distribution control apparatus 50A may display, on the display unit 4, information indicating the ON control order of the group to which the consumer who uses the display unit 4 belongs.

Thereafter, the display unit 4 may display the information received from the power distribution control apparatus 50A, as illustrated in a section (b) of FIG. 20, for example.

The section (b) of FIG. 20 indicates that the consumer who uses the display unit 4 belongs to the group having an ON control order position of "4".

By viewing the sections (a) and (b) of FIG. 20, the consumer can be aware of the electricity backup status from the storage battery system 10 and when the electricity backup for the consumer is performed.

In addition, the power distribution control apparatus 50A may estimate a period of time remaining until the consumer who uses the display unit 4 can receive an electricity backup service from the storage battery system 10 and may provide information indicating the estimated period of time to the display unit 4.

Thereafter, the display unit 4 may display the information received from the power distribution control apparatus 50A thereon, as illustrated in a section (c) of FIG. 20, for example.

The section (c) of FIG. 20 illustrates a period of time remaining until power backup using the storage battery system is performed for a consumer.

Note that in the third, sixth, and seventh embodiments described above, the display unit 4 may acquire information indicating the power supply status from the storage battery system 10 to each of the specific load group and the general load group and display the acquired information.

In addition, in the embodiments described above, the display unit 4 may acquire information indicating the power outage status and display the acquired information. In the seventh embodiment described above, the display unit 4 may acquire information indicating the tightness of supply of the commercial electricity and display the acquired information.

(2) In the first to sixth embodiments described above, the control unit of the power distribution control apparatus (or the house-to-house power distribution control unit) performs ON control on each of the switches in the order of ON control stored in the ON control order storage unit. However, control performed by the power distribution control apparatus is not limited thereto.

For example, the power distribution control apparatus may include an ON control time storage unit that stores an ON control time for each of the switches instead of the ON control order storage unit. The ON control time is a period of time from the time the switch is subjected to OFF control to the time the switch is subjected to ON control. Thereafter, the control unit of the power distribution control apparatus may perform the ON control on each of the switches in accordance with the ON control time.

A particular example is described next with reference to FIG. 21.

Figure 21:
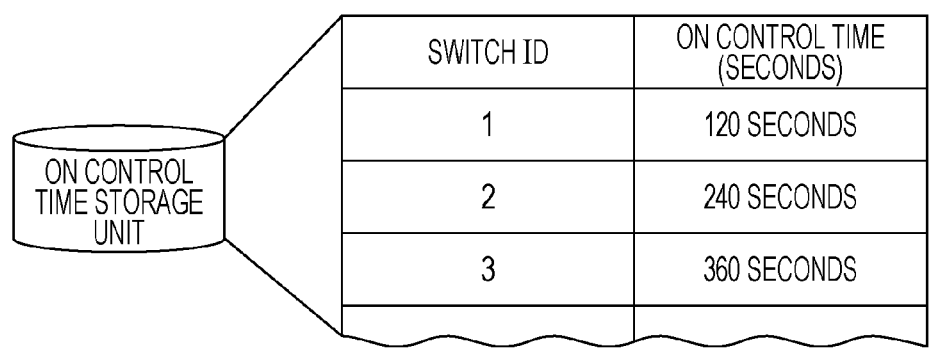
FIG. 21 illustrates an example of information stored in an ON control time storage unit according to a modification (2)

FIG. 21 illustrates an example of information stored in the ON control time storage unit. The ON control time storage unit is provided instead of the ON control order storage unit 151 of the house-to-house power distribution control unit 150 according to the fourth embodiment described above.

In FIG. 21, the ON control time storage unit has a "switch ID" field and an "ON control time" field. Thus, the ON control time storage unit stores, for each of the switches, a period of time from the time the control unit 152 performs OFF control on the switch to the time the control unit 152 performs ON control on the switch.

At that time, if the control unit 152 determines that 120 seconds has elapsed since the execution of OFF control on all of the switches in step S202 (FIG. 12), the control unit 152 may perform ON control on the switch having an ID of "1". Similarly, if the control unit 152 determines that 240 seconds has elapsed since step S202, the control unit 152 may perform ON control on the switch having an ID of "2".

(3) In step S104 (FIG. 3), the control unit 52 of the power distribution control apparatus 50 according to the first embodiment described above performs the ON control on the switches at, for example, predetermined intervals. However, the control performed by the control unit 52 is not limited thereto.

For example, the control unit 52 may monitor the power supply path from the storage battery system to the load group. If, after performing ON control on one of the switches, the control unit 52 determines that the value of an inrush current generated by the ON control performed on the switch is less than or equal to a predetermined threshold value, the control unit 52 may perform ON control on the switch having the next position in the ON control order.

(4) While the above embodiments have been described with reference to an example in which a plurality of consumers share the storage battery system, only one of the consumers may exclusively use the storage battery system.

Figure 22:
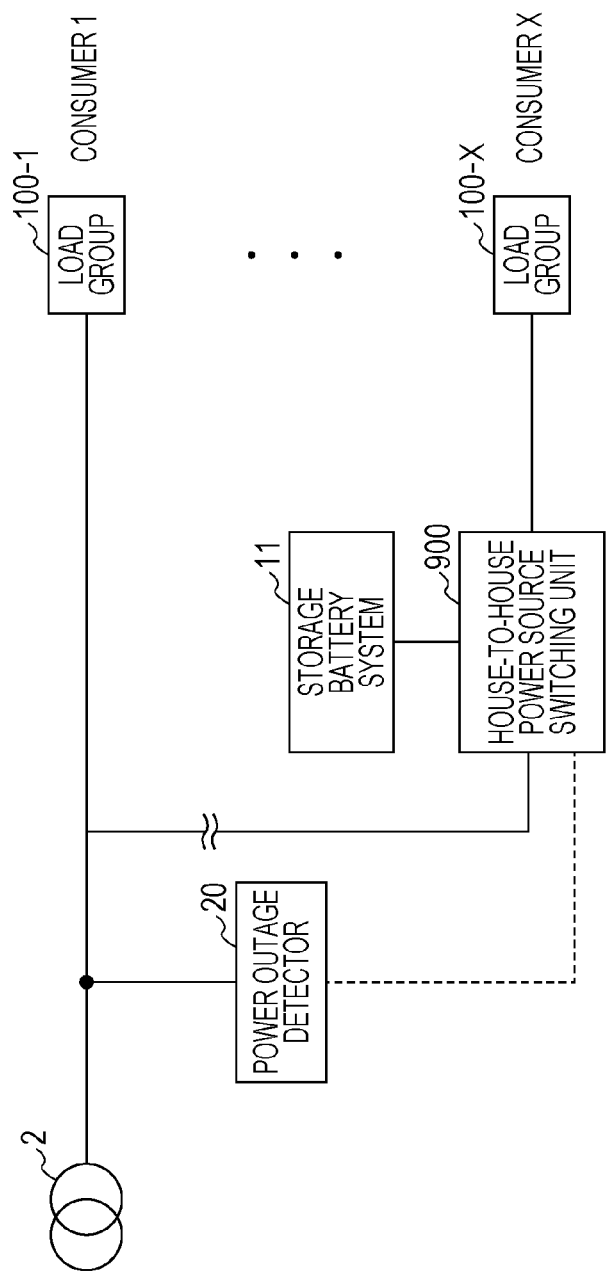
FIG. 22 illustrates an example of a storage battery system used by only one consumer in the power distribution control system according to modification (4)

For example, as illustrated in FIG. 22, one of the consumers X may have a storage battery system 11. A house-to-house power source switching unit 900 provided in the power supply path to the consumer X may switch the power source between the commercial power source, which is a power source of a load group 100-X, and the storage battery system 11.

The storage battery system 11 has functions that are the same as those of the storage battery system 10 of the embodiments described above. Note that the storage battery system 11 supplies the electric power to the load group 100-X.

Like the power switching unit according to each of the embodiments described above, the house-to-house power source switching unit 900 switches the power source for a load group. Note that the house-to-house power source switching unit 900 switches the power source for the load group 100-X (between the commercial power source and the storage battery system 11).

(5) The power source switching units (the house-to-house power source switching units) in the above embodiments and the modifications are described in more detail below.

For example, as described in the sixth embodiment above, the power source switching unit may supply electric power from the storage battery system to the load group when electric power is supplied from the commercial power source to the load group.

In addition, the power source switching unit may completely switch between the commercial power source and the storage battery system so that electric power is supplied from either the commercial power source or the storage battery system.

Figure 23:
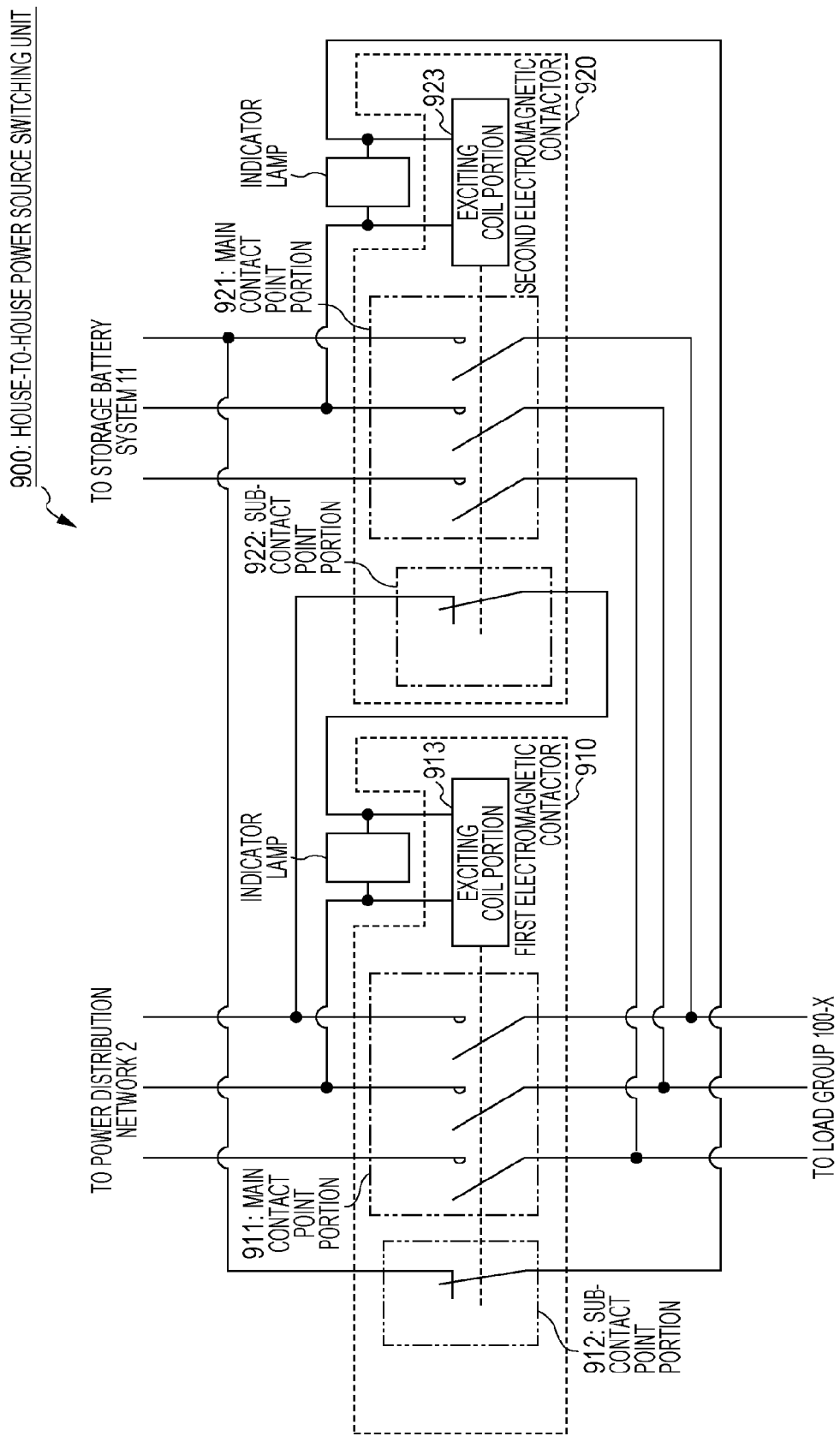
FIG. 23 illustrates the configuration of a house-to-house power source switching unit according to modification (5)

A particular example of the configuration of the power source switching unit that completely switches a power source between the commercial power source and the storage battery system is described below with reference to FIG. 23. FIG. 23 illustrates an example of the configuration of the house-to-house power source switching unit 900 according to the modification (2) described above. In addition, in FIG. 23, the load group 100-X receives electric power from the commercial power source and the storage battery system 11 via a single-phase three-wire distribution line.

As illustrated in FIG. 23, the house-to-house power source switching unit 900 includes a first electromagnetic contactor 910 and a second electromagnetic contactor 920.

The first electromagnetic contactor 910 includes a main contact point portion 911, a sub-contact point portion 912, and an exciting coil portion 913.

The main contact point portion 911 opens and closes the power supply path of the commercial power source formed as the single-phase three-wire distribution line.

The sub-contact point portion 912 opens and closes the power supply path from the storage battery system 11 to an exciting coil portion 923 (described in detail below) of the second electromagnetic contactor 920.

Both ends of the exciting coil portion 913 are connected to the power supply path of the commercial power source formed as a single-phase three-wire distribution line. Thus, a closed circuit is formed. The exciting coil portion 913 opens and closes each of the main contact point portion 911 and the sub-contact point portion 912 using the excitation effect of the exciting coil portion 913.

More specifically, when an electric current flows in the exciting coil portion 913, the main contact point portion 911 is in a closed state (a state in which the electric power supplied from the commercial power source is delivered to the load group 100-X). The sub-contact point portion 912 is in an open state (a state in which the electric power supplied from the storage battery system 11 is not delivered to the exciting coil portion 923). (the exciting coil portion 913: excited state). In contrast, when no electric current flows in the exciting coil portion 913, the main contact point portion 911 is in an open state (a state in which the electric power supplied from the commercial power source is not delivered to the load group 100-X). The sub-contact point portion 912 is in a closed state (a state in which the electric power supplied from the storage battery system 11 is delivered to the exciting coil portion 923). (the exciting coil portion 913: non-excited state).

Note that by incorporating a rectifier (not illustrated) that converts an AC current into a DC current flowing in the power supply path, the exciting coil portion 913 AC-drives the first electromagnetic contactor 910.

The second electromagnetic contactor 920 includes a main contact point portion 921, a sub-contact point portion 922, and an exciting coil portion 923.

The main contact point portion 921 opens and closes the power supply path of the storage battery system 11 formed as a single-phase three-wire distribution line.

The sub-contact point portion 922 opens and closes the power supply path from the commercial power source to the exciting coil portion 913 of the first electromagnetic contactor.

Both ends of the exciting coil portion 923 are connected to the power supply path of the storage battery system formed as a single-phase three-wire distribution line. Thus, a closed circuit is formed. The exciting coil portion 923 opens and closes each of the main contact point portion 921 and the sub-contact point portion 922 using the excitation effect of the exciting coil portion 923.

More specifically, when an electric current flows in the exciting coil portion 923, the main contact point portion 921 is in a closed state (a state in which the electric power supplied from the storage battery system 11 is delivered to the load group 100-X). The sub-contact point portion 922 is in an open state (a state in which the electric power supplied from the commercial power source is not delivered to the exciting coil portion 913) (the exciting coil portion 923: excited state). In contrast, when no electric current flows in the exciting coil portion 923, the main contact point portion 921 is in an open state (a state in which the electric power supplied from the storage battery system 11 is not delivered to the load group 100-X). The sub-contact point portion 922 is in a closed state (a state in which the electric power supplied from the commercial power source is delivered to the exciting coil portion 913). (the exciting coil portion 923: non-excited state).

Note that by incorporating a rectifier (not illustrated) that converts an AC current into a DC current flowing in the power supply path, the exciting coil portion 923 AC-drives the second electromagnetic contactor 920. Also, note that the present disclosure may apply to a single-phase three-wire power supply system.

(i) When electric power supplied from the commercial power source is delivered to the load group 100-X and if supply of electric power from the storage battery system 11 to the load group 100-X is stopped, the sub-contact point portion 922 of the second electromagnetic contactor 920 is in the closed state. Accordingly, an electric current flows in the exciting coil portion 913 of the first electromagnetic contactor 910. Since the electric current continuously flows in the exciting coil portion 913, the main contact point portion 911 remains in the closed state. Thus, supply of electric power from the commercial power source to the load group continues.

Note that at that time (i.e., when an electric current continuously flows in the exciting coil portion 913), the sub-contact point portion 912 maintains the open state. Accordingly, when electric power supplied from the commercial power source is delivered to the load group 100-X and even if supply of electric power from the storage battery system 11 to the load group is started, no electric current flows in the exciting coil portion 923 of the second electromagnetic contactor 920. Thus, the main contact point portion 921 of the second electromagnetic contactor 920 maintains the open state. As a result, the electric power supplied from the storage battery system 11 is not delivered to the load group 100-X.

(ii) When supply of power from the commercial power source to the load group 100-X is stopped and if electric power supplied from the storage battery system 11 is delivered to the load group 100-X, the sub-contact point portion 912 of the first electromagnetic contactor 910 is in the closed state. Accordingly, an electric current flows in the exciting coil portion 923 of the second electromagnetic contactor 920. Since the electric current continuously flows in the exciting coil portion 923, the main contact point portion 921 maintains the closed state. Thus, electric power supplied from the storage battery system 11 is continuously delivered to the load group 100-X.

Note that at that time (i.e., when an electric current continuously flows in the exciting coil portion 923), the sub-contact point portion 922 maintains the open state. Accordingly, even if supply of electric power from the commercial power source to the load group 100-X is started when electric power supplied from the storage battery system 11 is delivered to the load group 100-X, no electric current flows in the exciting coil portion 913 of the first electromagnetic contactor 910. Thus, the main contact point portion 911 of the first electromagnetic contactor 910 maintains the open state. As a result, the electric power from the commercial power source is not delivered to the load group 100-X.

By configuring the house-to-house power supply switching unit 900 as illustrated in FIG. 23, the operation of the storage battery system 11 can be performed without supplying electric power from both the commercial power source and the storage battery system 11 to the load group 100-X.

While the above description has been made with reference to the case in which electric power is supplied to the load group using a single-phase three-wire distribution line, the above-described power source switching method performed by the house-to-house power source switching unit 900 is not limited to such a case. The house-to-house power source switching unit 900 illustrated in FIG. 23 may be modified to supply electric power to the load group using a single phase system.

In addition, the above-described power source switching method performed by the house-to-house power source switching unit 900 may be applied to the power source switching unit of the power distribution control system according to each of the above-described embodiments.

(6) While the second embodiment above has been described with reference to particular setting of groups of the switches using a setting apparatus and particular setting of the ON control order of the switches in each group, the settings may be made as follows.

(6-1) An estimated value of an inrush current generated for each of the consumers is theoretically calculated using, for example, historical information regarding the power usage of each of the consumers, historical information regarding a maximum value of a current supplied to each of the consumers, and historical information regarding the inrush current for each of the consumers. Thereafter, the number of consumers and the formation of the consumers in each group may be determined so that the sum of the estimated values of an inrush current for the consumers in each group is less than or equal to a threshold value determined on the basis of the power supplying capability of the storage battery system. In addition, in grouping, the groups may be set while taking into account the inrush current so that a group including essentials for life of a resident (e.g., a toilet, lighting equipment, communication devices, or a refrigerator) and an appliance having a lower inrush current and lower power consumption (i.e., the battery supplies electricity for a longer period of time) has a higher priority. To obtain a value of power consumption, at least one of the following information items of the appliance is used: the standby electricity, the average power consumption, the maximum power consumption, a variation of the electric power during a predetermined period of time (e.g., 30-minute intervals), and the number of variations of the electric power. Note that the appliances may be classified into a group of appliances for which any one of the power consumption, the input current value, and the inrush current is unknown and a group of appliances for which the power consumption, the input current value, and the inrush current are known. In this manner, if an abnormal amount of electric power is supplied from the battery or the battery malfunctions due to the inrush current, the problem can be easily located.

To configure groups, the groups may be formed on a power distribution panel basis or a breaker basis (a breaker separates circuits from one another). A power distribution panel may include breakers for a plurality of groups (may include a relay, a switch, an electromagnetic coil, or a contact switch as another configuration). Alternatively, the power usage of each of branch circuits may be measured using, for example, a CT and be used as power usage information regarding each group. The power usage information may be provided to the resident, or may be used to estimate a remaining battery time when power is lost or supply of the electricity is tight. Still alternatively, some or all of these functions may be included in the configuration of a battery or a controller. Note that the electricity storage system may ask the resident for permission to supply the electricity. In addition, if the stored electricity level is low, the electricity storage system may automatically perform a charge operation in a time zone immediately before and after the time zone during which supply of electricity is tight (including a planned outage time zone) or a time zone during which the electric power rates are low (e.g., in the nighttime).

In addition to the system configuration for a housing complex according to the embodiments of the present invention, some or all of the configurations of the present invention may be realized in the form of a system such as an electricity storage system or a controller.

(6-2) In addition, the estimated value of an inrush current generated for each of the consumers in the above-described modification (6-1) may be theoretically calculated on the basis of the structure of persons who consume electric power of each of the consumers (the family structure).

(6-3) In addition, as the number of groups increases, a consumer that belongs to a group having a low position in the ON control order waits for a longer period of time until electricity is supplied from the storage battery system. Accordingly, the number of consumers in a group and the structure of consumers may be set such that the number of the groups decreases.

(6-4) In addition, the positions of the groups in the ON control order may be set such that the position of a particular one of the groups is not always low. More specifically, every time the ON control is performed, the positions in the ON control order may be periodically or randomly changed.

(6-5) In addition, the groups of the switches and the positions of the groups in the ON control order may be set such that the positions of some of the consumers in the ON control order are always high.

(6-5-1) For example, the groups are set such that consumers each including a person who requires fast recovery of power, such as a child, an aged person, or an ill person, belong to the same group, and the position of the group in the ON control order may be set to be high.

In addition, for a housing complex, it is desirable that power supplied to a load group for a common use space used by all the residents of the housing complex be in fast widespread use. Accordingly, for example, the groups and the positions of the groups in the ON control order may be set such that the position of the load group for the common use space is high.

(6-5-2) The positions of some of the consumers in the ON control order may be set to be high in accordance with the power purchase agreements.

The groups may be set such that the consumers having the same power purchase agreement belong to the same group, and the ON control order may be determined in accordance with the power purchase agreement. In addition, for the housing complex, such as a condominium building, the groups of the switches may be set such that a consumer that occupies a condominium unit having a higher selling price or a higher rent belongs to a group having a higher position in the ON control order. Alternatively, in return for setting the position of one of the groups in the ON control order to be high, the power rates for a consumer that belongs to the group may be set to be high.

(7) In the second embodiment described above, the control unit 52A sequentially performs the ON control on the switches 40-1, . . . , and 40-N on a group basis using the positions of the switches 40-1, . . . , and 40-N in the ON control order stored in the ON control order storage unit 51A. However, the ON control may be modified in the following manner.

Figure 24:
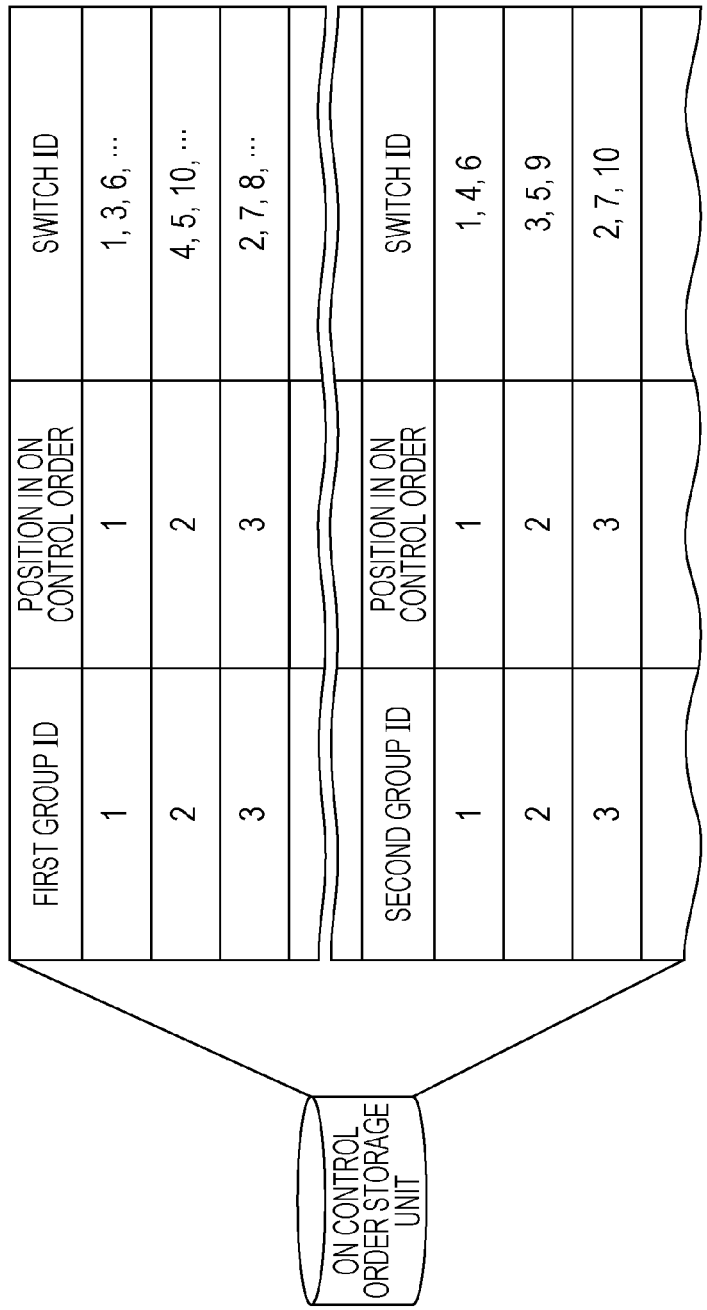
FIG. 24 illustrates an example of information stored in an ON control order storage unit according to modification (7)

As illustrated in FIG. 24, the ON control order storage unit 51A stores a plurality of patterns of order in which the control unit 52A performs the ON control on the switches 40-1, . . . , and 40-N. In FIG. 24, the switches 40-1, . . . , and 40-N are classified into a plurality of groups, that is, a first group and a second group. Thereafter, the ON control order of the switches 40-1, . . . , and 40-N set for each of the first group and the second group is stored in the ON control order storage unit 51A.

At that time, the control unit 52A may sequentially perform, on a group basis, the ON control on the switches 40-1, . . . , and 40-N using the ON control order of the switches 40-1, . . . , and 40-N set for the first group first. Thereafter, the control unit 52A may monitor the power supply path from the storage battery system to the load group. If, after one of the switches is subjected to the ON control, the value of an inrush current generated by the ON control performed on the switch is greater than or equal to a predetermined threshold value, the control unit 52A may perform the ON control again on the switches 40-1, . . . , and 40-N using the ON control order of the switches 40-1, ..., and 40-N set for the second group.

Figure 25:
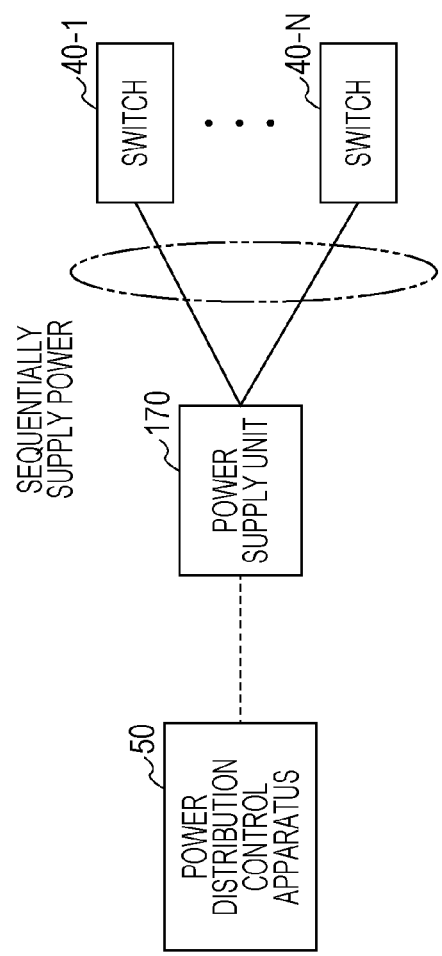
FIG. 25 illustrates modification (8)

(8) In the power distribution control system 1 according to the first embodiment described above, each of the switches 40-1, ..., and 40-N may be an exciting switch. When an exciting switch is used as each of the switches 40-1, ..., and 40-N, a power supply unit 170 further provided in the power distribution control system 1 may receive an instruction from the power distribution control apparatus 50 and sequentially apply power to the switches 40-1, ..., and 40-N, as illustrated in FIG. 25. Thus, the ON control may be performed on the switches 40-1, ..., and 40-N. While the example has been described with reference to the above-described first embodiment, an exciting switch may be similarly used as each of the switches in the power distribution control system of each of the second to seventh embodiments described above.

(9) While the power distribution control system 1 according to the first embodiment above has been described with reference to the switches 40-1, ..., and 40-N provided in the power supply paths of the load groups 100-1, ..., and 100-N used by the consumer 1, ..., and N, respectively, the configuration is not limited thereto. In the power distribution control system 1, a switch may be provided in the power supply path of the load group used by a plurality of consumer, and the switch may have a function to open and close each of the power supply paths to the load groups used by a plurality of consumers. Alternatively, in the power distribution control system 1, a switch may be provided in each of the power supply paths that supply electric power to the load groups used by a plurality of consumers.

Note that if, in the power distribution control system 1, the above-described switches that control supply of power to the load groups for a plurality of consumers are provided, it is desirable that the number of consumers be determined on the basis of the power supplying capability of the storage battery system 10 in order to prevent a voltage drop in the power supply path caused by the inrush current generated when one of the switches is subjected to the ON control.

(10) The power distribution control system according to each of the sixth and seventh embodiments described above may include a house-to-house distribution control apparatus for each of the consumers instead of the power distribution control apparatus, and the house-to-house distribution control apparatus may perform ON control and OFF control on each of the switches for each of the consumers (and further control on the power source control unit 160 in the power distribution control system according to the seventh embodiment described above).

(11) In the power distribution control system 1C according to the fourth embodiment described above, the smart meter 60 or the power distribution panel 70 may incorporate the house-to-house power distribution control unit 150 therein. Alternatively, the power distribution panel 70 may incorporate the house-to-house power distribution control unit 150 and the switches 140-1, ..., and 140-M therein, and the power distribution panel 70 may control application of electric power from the storage battery system to each of the load groups 400-1, ..., 400-N.

(12) In the power distribution control system 1C according to the fourth embodiment described above, the power source switching unit 130 switches power sources upon receiving, from the power outage detector 120, a message indicating power outage or recovery of power. Even in the power distribution control system according to the first, second, fifth, and sixth embodiments described above, the power outage detector 120 and the power source switching unit 130 may be provided instead of the power outage detector 20 and the power source switching unit 30, and control performed by the power distribution control apparatus on the power source switching unit may be eliminated.

(13) In the embodiments and the modifications described above, the power source switching unit may have a function of a power outage detector, or the storage battery system may have a function of a power outage detector.

(14) The capacity of the storage battery system is limited. Accordingly, in the embodiments and the modifications described above, the storage battery system may supply electric power to only a specific load group without supplying electric power to a general load group.

9. Further Notes

The configurations of the power distribution control system, the power distribution control method, the display unit, and the power source switching apparatus according to the embodiments of the present disclosure, the modifications of the embodiments, and the effects of the configurations and the modifications are described below.

(A) According to an embodiment of the present disclosure, a power distribution control system includes a power source switching unit that is provided in a power supply path that supplies electric power from a power source to a plurality of the load groups and that switches the power source between a first power source and a second power source having a power supplying capability lower than that of the first power source, a detection unit that detects power outage of the first power source, switches provided in power supply paths that are located downstream of the power source switching unit for some or all of load groups, a control unit that controls a switching operation performed by the power source switching unit and performs ON and OFF control on each of the switches, and an order storage unit that stores the order in which the control unit performs ON control on the switches. If the detection unit detects power outage, the control unit performs OFF control on the switches. After all the switches are subjected to the OFF control, the control unit controls the switching operation performed by the power source switching unit so that the power source is switched from the first power source to the second power source. After controlling the switching operation from the first power source to the second power source, the control unit performs ON control on the switches in the order stored in the order storage unit.

According to such a configuration, the power distribution control system described in (A) can stably supply electric power when supply of the electric power from the storage battery system to a load group is started.

(B) The power distribution control system according to (A) may further include an order determination unit that classifies the switches into groups on the basis of the power supplying capability of the second power source, determines the positions of the groups in the order, and stores, in the order storage unit, the determined positions in the order.

According to such a configuration, the power distribution control system described in (B) can sequentially distribute electric power from the second power source to the load groups while taking into account the power supplying capability of the second power source.

(C) In the power distribution control system according to (B), the order determination unit may further classify the switches into groups on the basis of history information regarding the demand and supply of electricity for each of the plurality of load groups.

According to such a configuration, the power distribution control system described in (C) can determine the order while taking into account the power supplying capability of the second power source.

(D) In the power distribution control system according to (C), the order determination unit may further determine the order on the basis of history information regarding the demand and supply of electricity for each of the plurality of load groups.

According to such a configuration, the power distribution control system described in (D) can sequentially distribute electric power from the second power source to the load groups while taking into account the power usage of each of the consumers.

(E) In the power distribution control system according to the above-described embodiment (B), each of the load groups may be a set of loads used by one of the consumers, and the order determination unit may further classify the switches into groups on the basis of a power purchase agreement with each of the consumers.

According to such a configuration, the power distribution control system described in (E) can sequentially distribute electric power from the second power source to the load groups in accordance with the power purchase agreement with each of the consumers.

(F) In the power distribution control system according to the above-described embodiment (E), the order determination unit may further determine the order on the basis of a power purchase agreement with each of the consumers.

According to such a configuration, the power distribution control system described in (F) can determine the order in accordance with the power purchase agreement with each of the consumers.

(G) In the power distribution control system according to the above-described embodiment (A), the load group may include at least one specific load having a high priority of power recovery, and each of the switches may be provided in a power supply path for a load other than the above-described specific load.

According to such a configuration, the power distribution control system described in (G) can sequentially distribute electric power from the second power source to the load groups by separating the specific load group from the general load group.

(H) According to an embodiment of the present disclosure, a power distribution control method for controlling a power source switching unit that is provided in a power supply path that supplies electric power from a power source to a plurality of load groups and that switches the power source between the first power source and a second power source having a power supplying capability lower than that of the first power source and a switch provided in a power supply path located downstream of the power source switching unit for each of some or all of load groups is provided. The method includes a detection step of detecting power outage of the first power source and a control step of controlling a switching operation performed by the power source switching unit and performing ON and OFF control on each of the switches. The control step includes, if power outage is detected in the detection step, performing OFF control on the switches and controlling the switching operation performed by the power source switching unit so that the power source is switched from the first power source to the second power source after all of the switches are subjected to the OFF control. The control step further includes performing the ON control on the switches in the order stored in an order storage unit after the power source is switched from the first power source to the second power source.

According to such a configuration, the power distribution control system described in (H) can stably supply electric power when supply of the electric power from the storage battery system to a load group is started.

(I) According to an embodiment of the present disclosure, a display apparatus for allowing a consumer who uses the power distribution control system according to claim 1 to view information thereon includes a switch information acquiring unit for acquiring information regarding the ON control performed on each of the switches by the control unit and a display unit for displaying the information acquired by the switch information acquiring unit.

According to such a configuration, the display apparatus described in (I) can provide information regarding power distribution control to the user.

(J) According to an embodiment of the present disclosure, a power distribution control system includes a power source switching unit that is provided in a power supply path that supplies electric power from a power source to load groups and that switches the power source between a first power source and a second power source having a power supplying capability lower than that of the first power source and switches provided in power supply paths located downstream of the power source switching unit for some loads in the load groups. Upon receiving information indicating power outage of the first power source, the power source switching unit switches the power source from the first power source to the second power source. The switch includes a contact point portion provided in the power supply path and an exciting coil portion connected to each of the power supply paths located upstream and downstream of the contact point portion. The contact point portion enters a closed state in response to an ON operation performed by a user. Since an electric current flows in the exciting coil portion due to the closed state of the contact point portion, the exciting coil portion maintains the closed state of the contact point portion using the excitation effect.

According to such a configuration, in case of stoppage of supply of electric power to the load group, the switch of the power distribution control system described in (J) automatically enters an off state. If supply of electric power to the load group resumes, the switch enters an on state by an ON operation performed by the user. Thus, the power distribution control system described in (J) can stably supply electric power without having a configuration to control the switch when supply of electric power from the storage battery system to the load group is started.

(K) The power distribution control system described in the above-described embodiment (J) may further include a notification unit for notifying the user of a state in which supply of electric power to the load group is started by the ON operation when the switch is in the OFF state.

According to such a configuration, the power distribution control system described in (K) can notify the user of a state in which electricity backup is being provided from the second power source to the load group and the provided electric power is deliverable from the second power source to the load group by an ON operation performed by the user.

(L) According to an embodiment of the present disclosure, a power source switching apparatus is provided in a power supply path for supplying electric power from a power source to a load group. The power source switching apparatus switches the power source between a first power source and a second power source. The power source switching apparatus includes a first contact point portion provided in a first power source electricity supply path for supplying electric power from the first power source to the load group, a second contact point portion provided in a second power source electricity supply path for supplying electric power from the second power source to the load group, a first exciting coil portion having both ends connected to the first power source electricity supply path located upstream of the first contact point portion to form a closed circuit, where the first exciting coil portion opens and closes the first contact point portion using the excitation effect, a third contact point portion provided in the closed circuit formed by the first power source electricity supply path and the first exciting coil portion, a second exciting coil portion having both ends connected to the second power source electricity supply path located upstream of the second contact point portion to form a closed circuit, where the second exciting coil portion opens and closes the second contact point portion using the excitation effect, and a fourth contact point portion provided in the closed circuit formed by the second power source electricity supply path and the second exciting coil portion. The first exciting coil portion further opens and closes the fourth contact point portion by the excitation effect. The second exciting coil portion further opens and closes the third contact point portion by the excitation effect. The first contact point portion enters the closed state by the excited state of the first exciting coil portion and enters the open state by non-excited state of the first exciting coil portion. The second contact point portion enters the closed state by the excited state of the second exciting coil portion and enters the open state by non-excited state of the second exciting coil portion. The third contact point portion enters the open state by the excited state of the second exciting coil portion and enters the closed state by a non-excited state of the second exciting coil portion. The fourth contact point portion enters the open state by the excited state of the first exciting coil portion and enters the closed state by a non-excited state of the first exciting coil portion.

According to such a configuration, the power source switching apparatus described in (L) can completely switch the electric power source for the load group between the first power source and the second power source.

(M) The power source switching apparatus described in the above-described embodiment (L) may further include a first notification unit that notifies the user of the closed state of the first contact point portion and a second notification unit that notifies the user of the closed state of the second contact point portion.

According to such a configuration, the power source switching apparatus described in (M) can notify the user of which one of the first power source and the second power source is supplying electric power to the load group.

The present invention is applicable to a variety of systems that supply electric power from a storage battery system to a load group. The system can be used in, for example, a housing complex, a community, a standard house, or a manufacturing building having a storage battery system installed therein as a power source.

What is claimed is:

1. A power distribution control apparatus comprising:
a power source switch operative to switch a power source for supplying electric power to a plurality of load groups between a commercial power source and a battery;
control circuitry operative to control the power source switch and a plurality of switches provided in power supply paths between the power source switch and the plurality of load groups; and
a memory operative to store positions of the plurality of switches in an order of priority,
wherein, when the power source switch switches to the commercial power source and a power saving time zone is reached, the power saving time zone being determined in advance and designating a period of time in which commercial power consumption is to be reduced, the control circuitry controls the plurality of switches to be in a non-conducting state, switches the power source from the commercial power source to the battery using the power source switch, and sequentially controls the plurality of switches in a conducting state in the order of priority.

2. The power distribution control apparatus according to claim 1,
wherein the plurality of load groups includes a second load group representing a load including at least one of a refrigerator and a rice cooker and a first load group representing a load having a type that differs from the second load group, and
wherein the order of priority is set in the memory such that a position of the first load group in the order of priority is higher than a position of the second load group.

3. The power distribution control apparatus according to claim 2,
wherein, after a first predetermined period of time elapses since placement of a first switch connected to the first load group in the non-conducting state, the control circuitry controls the first switch to be in the conducting state, and
wherein, after a second predetermined period of time that is longer than the first predetermined period of time elapses since placement of a second switch connected to the second load group in the non-conducting state, the control circuitry controls the second switch to be in the conducting state.

4. The power distribution control apparatus according to claim 3, wherein the first predetermined period of time is less than 1 minute, and the second predetermined period of time is greater than or equal to 1 minute.

5. A power distribution control apparatus, comprising:
a power source switch operative to switch a power source for supplying electric power to a plurality of load groups between a commercial power source and a battery;
control circuitry operative to control the power source switch and a plurality of switches provided in power supply paths between the power source switch and the plurality of load groups; and
a memory operative to store positions of the plurality of switches in an order of priority,
wherein, when the power source switch switches to the commercial power source and a power saving time zone in which commercial power consumption is to be reduced is reached, the control circuitry controls the plurality of switches to be in a non-conducting state, switches the power source from the commercial power source to the battery using the power source switch, and sequentially controls the plurality of switches in a conducting state in the order of priority,
wherein the commercial power source is connected to a third load group, the third load group being configured to receive the electric power only from the commercial power source and not configured to receive the electric power from the battery, wherein the control circuitry controls an operation performed by the third load group via a communication network, and wherein, when the power saving time zone is reached, the control circuitry sends, to the third load group, a control signal to reduce the commercial power consumption.

6. The power distribution control apparatus according to claim 5, wherein the third load group is an air conditioner, wherein the control circuitry controls the operation performed by the air conditioner via the communication network, and wherein, when the power saving time zone is reached, the control circuitry sends, to the air conditioner, the control signal to one of switch the air conditioner from a power-on mode to a power-off mode and change temperature settings.

7. The power distribution control apparatus according to claim 1, further comprising:

a communicator operative to receive a power saving request signal that indicates a request for power saving to a consumer having a plurality of load groups, and wherein the control circuitry identifies a start time of the power saving time zone when the communicator receives the power saving request signal.

8. The power distribution control apparatus according to claim 1, wherein, when the plurality of load groups is to be connected to the battery and a dischargeable time of the battery is shorter than the power saving time zone, the control circuitry sets a delay time that is added to a discharge start time of the battery such that a discharge end time of the battery does not exceed an end time of the power saving time zone.

9. The power distribution control apparatus according to claim 8, wherein the battery includes batteries, each of the plurality of load groups being connected to one of the batteries, and wherein the control circuitry sets different delay times for the batteries.

10. The power distribution control apparatus according to claim 1, wherein each of the plurality of switches is the power supply switch, wherein each of the plurality of switches is capable of switching a connection to one of the plurality of loads between the battery and the commercial power source, wherein, when the control circuitry controls one of the plurality of switches to be connected to the battery, the power source is electrically coupled with a corresponding one of the plurality of loads, and wherein, when the control circuitry controls one of the plurality of switches to be disconnected from both the battery and the commercial power source, the power source is not electrically coupled with a corresponding one of the plurality of loads.

11. An electricity storage system comprising:
the battery; and
the power distribution control apparatus according to claim 1.

12. A power distribution control method comprising:

detecting that a power saving time zone is reached, the power saving time zone being determined in advance and designating a period of time in which commercial power consumption is to be reduced;

controlling, when a power source switch that switches a power source for supplying electric power to a plurality of loads between a commercial power source and a battery is connected to the commercial power source and the power saving time zone is reached, each of a plurality of switches provided in power supply paths between the power source switch and the plurality of load groups to be in a non-conducting state;

switching the power source from the commercial power source to the battery using the power source switch; and sequentially placing the plurality of switches in a conducting state in a predetermined order of priority.

13. A power distribution control method comprising:

detecting that a power saving time zone, in which electricity from a commercial power source is to be reduced, is reached;

controlling, when a power source switch that switches a power source for supplying electric power to a plurality of loads between a commercial power source and a battery is connected to the commercial power source and the power saving time zone is reached, each of a plurality of switches provided in power supply paths between the power source switch and the plurality of load groups to be in a non-conducting state;

switching the power source from the commercial power source to the battery using the power source switch; and sequentially placing the plurality of switches in a conducting state in a predetermined order of priority, wherein the commercial power source is connected to a third load group, the third load group being configured to receive the electric power only from the commercial power source and not configured to receive the electric power from the battery, and wherein the method further comprises:
controlling an operation performed by the third load group via a communication network; and
when the power saving time zone is reached, sending, to the third load group, a control signal to reduce the commercial power consumption.

* * * * *